United States Patent
Scapa et al.

(10) Patent No.: US 9,510,400 B2
(45) Date of Patent: Nov. 29, 2016

(54) USER INPUT SYSTEMS FOR AN LED-BASED LIGHT

(71) Applicant: iLumisys, Inc., Troy, MI (US)

(72) Inventors: James R. Scapa, West Bloomfield, MI (US); David L. Simon, Gross Pointe, MI (US); John Ivey, Farmington Hills, MI (US); James M. Amrine, Jr., Ann Arbor, MI (US); Brian Nickol, Macomb, MI (US)

(73) Assignee: iLumisys, Inc., Troy, MI (US)

( * ) Notice: Subject to any disclaimer, the term of this patent is extended or adjusted under 35 U.S.C. 154(b) by 0 days.

(21) Appl. No.: 14/709,990

(22) Filed: May 12, 2015

(65) Prior Publication Data

US 2015/0334790 A1    Nov. 19, 2015

Related U.S. Application Data

(60) Provisional application No. 61/992,290, filed on May 13, 2014.

(51) Int. Cl.
   *H05B 39/04*    (2006.01)
   *H05B 33/08*    (2006.01)

(52) U.S. Cl.
   CPC .......... *H05B 33/08* (2013.01); *H05B 33/0833* (2013.01); *Y02B 20/19* (2013.01); *Y02B 20/383* (2013.01)

(58) Field of Classification Search
   CPC .............................. H05B 37/02; H05B 33/08
   USPC ..................... 315/291, 246, 185 R, 312, 158
   See application file for complete search history.

(56) References Cited

U.S. PATENT DOCUMENTS

| | | |
|---|---|---|
| D79,814 S | 11/1929 | Hoch |
| D80,419 S | 1/1930 | Kramer |
| D84,763 S | 7/1931 | Stange |
| D119,797 S | 4/1940 | Winkler et al. |
| D125,312 S | 2/1941 | Logan |
| 2,826,679 A | 3/1958 | Rosenburg |

(Continued)

FOREIGN PATENT DOCUMENTS

| | | |
|---|---|---|
| CN | 1584388 A | 2/2005 |
| CN | 2766345 Y | 3/2006 |

(Continued)

OTHER PUBLICATIONS

Extended European Search Report for European Application No. 09822382.9 mailed on Sep. 19, 2014 in 8 pages.

(Continued)

*Primary Examiner* — Minh D A
(74) *Attorney, Agent, or Firm* — Fish & Richardson P.C.

(57) ABSTRACT

An LED-based replacement light includes a plurality of LEDs, an LED controller for operating the LEDs, a user input interface in communication with the LED controller, a housing for the LEDs, the LED controller and the user input interface, and a connector disposed at an end of the housing and shaped for connection with a light socket. The LED controller establishes different operating states for the LEDs that include only a limited number of discrete ON states. The user input interface is configured to receive user input, and in response to the user input, activate the LED controller to operate the LEDs according to one of the different operating states.

14 Claims, 6 Drawing Sheets

(56) References Cited

U.S. PATENT DOCUMENTS

| | | | |
|---|---|---|---|
| 2,909,097 A | 10/1959 | Alden et al. |
| 3,178,622 A | 4/1965 | Paul et al. |
| 3,272,977 A | 9/1966 | Holmes |
| 3,318,185 A | 5/1967 | Kott |
| 3,561,719 A | 2/1971 | Grindle |
| 3,586,936 A | 6/1971 | Mcleroy |
| 3,601,621 A | 8/1971 | Ritchie |
| 3,612,855 A | 10/1971 | Juhnke |
| 3,643,088 A | 2/1972 | Osteen et al. |
| 3,739,336 A | 6/1973 | Burland |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,969,720 A | 7/1976 | Nishino |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,261,029 A | 4/1981 | Mousset |
| 4,262,255 A | 4/1981 | Kokei et al. |
| 4,271,408 A | 6/1981 | Teshima et al. |
| 4,271,458 A | 6/1981 | George, Jr. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,344,117 A | 8/1982 | Niccum |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,521,835 A | 6/1985 | Meggs et al. |
| 4,531,114 A | 7/1985 | Topol et al. |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,650,971 A | 3/1987 | Manecci et al. |
| 4,656,398 A | 4/1987 | Michael et al. |
| 4,661,890 A | 4/1987 | Watanabe et al. |
| 4,668,895 A | 5/1987 | Schneiter |
| 4,669,033 A | 5/1987 | Lee |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,739,454 A | 4/1988 | Federgreen |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,765,708 A | 8/1988 | Becker et al. |
| 4,771,274 A | 9/1988 | Havel |
| 4,780,621 A | 10/1988 | Bartleucci et al. |
| 4,794,373 A | 12/1988 | Harrison |
| 4,794,383 A | 12/1988 | Havel |
| 4,801,928 A | 1/1989 | Minter |
| 4,810,937 A | 3/1989 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,847,536 A | 7/1989 | Lowe et al. |
| 4,851,972 A | 7/1989 | Altman |
| 4,854,701 A | 8/1989 | Noll et al. |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,904,988 A | 2/1990 | Nesbit et al. |
| 4,912,371 A | 3/1990 | Hamilton |
| 4,920,459 A | 4/1990 | Rothwell, Jr. et al. |
| 4,922,154 A | 5/1990 | Cacoub |
| 4,929,936 A | 5/1990 | Friedman et al. |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,977,351 A | 12/1990 | Bavaro et al. |
| 4,979,081 A | 12/1990 | Leach et al. |
| 4,979,180 A | 12/1990 | Muncheryan |
| 4,980,806 A | 12/1990 | Taylor et al. |
| 4,991,070 A | 2/1991 | Stob |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,032,960 A | 7/1991 | Katoh |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,136,483 A | 8/1992 | Schoniger et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |

(56) References Cited

U.S. PATENT DOCUMENTS

| | | |
|---|---|---|
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,281,961 A | 1/1994 | Elwell |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,341,988 A | 8/1994 | Rein et al. |
| 5,344,068 A | 9/1994 | Haessig |
| 5,350,977 A | 9/1994 | Hamamoto et al. |
| 5,357,170 A | 10/1994 | Luchaco et al. |
| 5,365,411 A | 11/1994 | Rycroft et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,094 A | 4/1995 | Green et al. |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,463,502 A | 10/1995 | Savage, Jr. |
| 5,465,144 A | 11/1995 | Parker et al. |
| 5,473,522 A | 12/1995 | Kriz et al. |
| 5,475,300 A | 12/1995 | Havel |
| 5,481,441 A | 1/1996 | Stevens |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,506,760 A | 4/1996 | Giebler et al. |
| 5,513,082 A | 4/1996 | Asano |
| 5,519,496 A | 5/1996 | Borgert et al. |
| 5,530,322 A | 6/1996 | Ference et al. |
| 5,539,628 A | 7/1996 | Seib |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,592,054 A | 1/1997 | Nerone et al. |
| 5,600,199 A | 2/1997 | Martin, Sr. et al. |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,640,061 A | 6/1997 | Bornhorst et al. |
| 5,640,141 A | 6/1997 | Myllymaki |
| 5,642,129 A | 6/1997 | Zavracky et al. |
| 5,655,830 A | 8/1997 | Ruskouski |
| 5,656,935 A | 8/1997 | Havel |
| 5,661,374 A | 8/1997 | Cassidy et al. |
| 5,661,645 A | 8/1997 | Hochstein |
| 5,673,059 A | 9/1997 | Zavracky et al. |
| 5,682,103 A | 10/1997 | Burrell |
| 5,684,523 A | 11/1997 | Satoh et al. |
| 5,688,042 A | 11/1997 | Madadi et al. |
| 5,697,695 A | 12/1997 | Lin et al. |
| 5,699,243 A | 12/1997 | Eckel et al. |
| 5,701,058 A | 12/1997 | Roth |
| 5,712,650 A | 1/1998 | Barlow |
| 5,713,655 A | 2/1998 | Blackman |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,781,108 A | 7/1998 | Jacob et al. |
| 5,784,006 A | 7/1998 | Hochstein |
| 5,785,227 A | 7/1998 | Akiba |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,806,965 A | 9/1998 | Deese |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |
| 5,831,522 A | 11/1998 | Weed et al. |
| 5,836,676 A | 11/1998 | Ando et al. |
| 5,841,177 A | 11/1998 | Komoto et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| 5,854,542 A | 12/1998 | Forbes |
| RE36,030 E | 1/1999 | Nadeau |
| 5,859,508 A | 1/1999 | Ge et al. |
| 5,865,529 A | 2/1999 | Yan |
| 5,870,233 A | 2/1999 | Benz et al. |
| 5,890,794 A | 4/1999 | Abtahi et al. |
| 5,896,010 A | 4/1999 | Mikolajczak et al. |
| 5,904,415 A | 5/1999 | Robertson et al. |
| 5,907,742 A | 5/1999 | Johnson et al. |
| 5,909,378 A | 6/1999 | De Milleville |
| 5,912,653 A | 6/1999 | Fitch |
| 5,917,287 A | 6/1999 | Haederle et al. |
| 5,917,534 A | 6/1999 | Rajeswaran |
| 5,921,660 A | 7/1999 | Yu |
| 5,924,784 A | 7/1999 | Chliwnyj et al. |
| 5,927,845 A | 7/1999 | Gustafson et al. |
| 5,934,792 A | 8/1999 | Camarota |
| 5,936,599 A | 8/1999 | Reymond |
| 5,943,802 A | 8/1999 | Tijanic |
| 5,946,209 A | 8/1999 | Eckel et al. |
| 5,949,347 A | 9/1999 | Wu |

(56) References Cited

U.S. PATENT DOCUMENTS

| | | |
|---|---|---|
| 5,951,145 A | 9/1999 | Iwasaki et al. |
| 5,952,680 A | 9/1999 | Strite |
| 5,959,547 A | 9/1999 | Tubel et al. |
| 5,961,072 A | 10/1999 | Bodle |
| 5,962,989 A | 10/1999 | Baker |
| 5,962,992 A | 10/1999 | Huang et al. |
| 5,963,185 A | 10/1999 | Havel |
| 5,966,069 A | 10/1999 | Zmurk et al. |
| 5,971,597 A | 10/1999 | Baldwin et al. |
| 5,973,594 A | 10/1999 | Baldwin et al. |
| 5,974,553 A | 10/1999 | Gandar |
| 5,980,064 A | 11/1999 | Metroyanis |
| 5,998,925 A | 12/1999 | Shimizu et al. |
| 5,998,928 A | 12/1999 | Hipp |
| 6,000,807 A | 12/1999 | Moreland |
| 6,007,209 A | 12/1999 | Pelka |
| 6,008,783 A | 12/1999 | Kitagawa et al. |
| 6,010,228 A | 1/2000 | Blackman et al. |
| 6,011,691 A | 1/2000 | Schreffler |
| 6,016,038 A | 1/2000 | Mueller et al. |
| 6,018,237 A | 1/2000 | Havel |
| 6,019,493 A | 2/2000 | Kuo et al. |
| 6,020,825 A | 2/2000 | Chansky et al. |
| 6,025,550 A | 2/2000 | Kato |
| 6,028,694 A | 2/2000 | Schmidt |
| 6,030,099 A | 2/2000 | McDermott |
| 6,031,343 A | 2/2000 | Recknagel et al. |
| D422,737 S | 4/2000 | Orozco |
| 6,056,420 A | 5/2000 | Wilson et al. |
| 6,068,383 A | 5/2000 | Robertson et al. |
| 6,069,597 A | 5/2000 | Hansen |
| 6,072,280 A | 6/2000 | Allen |
| 6,074,074 A | 6/2000 | Marcus |
| 6,084,359 A | 7/2000 | Hetzel et al. |
| 6,086,220 A | 7/2000 | Lash et al. |
| 6,091,200 A | 7/2000 | Lenz |
| 6,092,915 A | 7/2000 | Rensch |
| 6,095,661 A | 8/2000 | Lebens et al. |
| 6,097,352 A | 8/2000 | Zavracky et al. |
| 6,107,755 A | 8/2000 | Katyl et al. |
| 6,116,748 A | 9/2000 | George |
| 6,121,875 A | 9/2000 | Hamm et al. |
| 6,127,783 A | 10/2000 | Pashley et al. |
| 6,132,072 A | 10/2000 | Turnbull et al. |
| 6,135,604 A | 10/2000 | Lin |
| 6,135,620 A | 10/2000 | Marsh |
| 6,139,174 A | 10/2000 | Butterworth |
| 6,149,283 A | 11/2000 | Conway et al. |
| 6,150,774 A | 11/2000 | Mueller et al. |
| 6,151,529 A | 11/2000 | Batko |
| 6,153,985 A | 11/2000 | Grossman |
| 6,158,882 A | 12/2000 | Bischoff, Jr. |
| 6,166,496 A | 12/2000 | Lys et al. |
| 6,175,201 B1 | 1/2001 | Sid |
| 6,175,220 B1 | 1/2001 | Billig et al. |
| 6,181,126 B1 | 1/2001 | Havel |
| D437,947 S | 2/2001 | Huang |
| 6,183,086 B1 | 2/2001 | Neubert |
| 6,183,104 B1 | 2/2001 | Ferrara |
| 6,184,628 B1 | 2/2001 | Ruthenberg |
| 6,196,471 B1 | 3/2001 | Ruthenberg |
| 6,203,180 B1 | 3/2001 | Fleischmann |
| 6,211,626 B1 | 4/2001 | Lys et al. |
| 6,215,409 B1 | 4/2001 | Blach |
| 6,217,190 B1 | 4/2001 | Altman et al. |
| 6,219,239 B1 | 4/2001 | Mellberg et al. |
| 6,220,722 B1 | 4/2001 | Begemann |
| 6,227,679 B1 | 5/2001 | Zhang et al. |
| 6,236,331 B1 | 5/2001 | Dussureault |
| 6,238,075 B1 | 5/2001 | Dealey, Jr. et al. |
| 6,241,359 B1 | 6/2001 | Lin |
| 6,249,221 B1 | 6/2001 | Reed |
| 6,250,774 B1 | 6/2001 | Begemann et al. |
| 6,252,350 B1 | 6/2001 | Alvarez |
| 6,252,358 B1 | 6/2001 | Xydis et al. |
| 6,268,600 B1 | 7/2001 | Nakamura et al. |
| 6,273,338 B1 | 8/2001 | White |
| 6,275,397 B1 | 8/2001 | McClain |
| 6,283,612 B1 | 9/2001 | Hunter |
| 6,290,140 B1 | 9/2001 | Pesko et al. |
| 6,292,901 B1 | 9/2001 | Lys et al. |
| 6,293,684 B1 | 9/2001 | Riblett |
| 6,297,724 B1 | 10/2001 | Bryans et al. |
| 6,305,109 B1 | 10/2001 | Lee |
| 6,305,821 B1 | 10/2001 | Hsieh et al. |
| 6,307,331 B1 | 10/2001 | Bonasia et al. |
| 6,310,590 B1 | 10/2001 | Havel |
| 6,315,429 B1 | 11/2001 | Grandolfo |
| 6,323,832 B1 | 11/2001 | Nishizawa et al. |
| 6,325,651 B1 | 12/2001 | Nishihara et al. |
| 6,334,699 B1 | 1/2002 | Gladnick |
| 6,340,868 B1 | 1/2002 | Lys et al. |
| 6,354,714 B1 | 3/2002 | Rhodes |
| 6,361,186 B1 | 3/2002 | Slayden |
| 6,362,578 B1 | 3/2002 | Swanson et al. |
| 6,369,525 B1 | 4/2002 | Chang et al. |
| 6,371,637 B1 | 4/2002 | Atchinson et al. |
| 6,373,733 B1 | 4/2002 | Wu et al. |
| 6,379,022 B1 | 4/2002 | Amerson et al. |
| D457,667 S | 5/2002 | Piepgras et al. |
| D457,669 S | 5/2002 | Piepgras et al. |
| D457,974 S | 5/2002 | Piepgras et al. |
| 6,388,393 B1 | 5/2002 | Illingworth |
| 6,388,396 B1 | 5/2002 | Katyl et al. |
| 6,394,623 B1 | 5/2002 | Tsui |
| 6,396,216 B1 | 5/2002 | Noone et al. |
| D458,395 S | 6/2002 | Piepgras et al. |
| 6,400,096 B1 | 6/2002 | Wells et al. |
| 6,404,131 B1 | 6/2002 | Kawano et al. |
| 6,411,022 B1 | 6/2002 | Machida |
| 6,411,045 B1 | 6/2002 | Nerone |
| 6,422,716 B2 | 7/2002 | Henrici et al. |
| 6,428,189 B1 | 8/2002 | Hochstein |
| 6,429,604 B1 | 8/2002 | Chang |
| D463,610 S | 9/2002 | Piepgras et al. |
| 6,445,139 B1 | 9/2002 | Marshall et al. |
| 6,448,550 B1 | 9/2002 | Nishimura |
| 6,448,716 B1 | 9/2002 | Hutchison |
| 6,459,919 B1 | 10/2002 | Lys et al. |
| 6,464,373 B1 | 10/2002 | Petrick |
| 6,469,457 B2 | 10/2002 | Callahan |
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,511,204 B2 | 1/2003 | Emmel et al. |
| 6,517,218 B2 | 2/2003 | Hochstein |
| 6,521,879 B1 | 2/2003 | Rand et al. |
| 6,522,078 B1 | 2/2003 | Okamoto et al. |
| 6,527,411 B1 | 3/2003 | Sayers |
| 6,528,954 B1 | 3/2003 | Lys et al. |
| 6,528,958 B2 | 3/2003 | Hulshof et al. |
| 6,538,375 B1 | 3/2003 | Duggal et al. |
| 6,540,381 B1 | 4/2003 | Douglass, II |
| 6,541,800 B2 | 4/2003 | Barnett et al. |
| 6,548,967 B1 | 4/2003 | Dowling et al. |
| 6,568,834 B1 | 5/2003 | Scianna |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Bättig |
| 6,582,103 B1 | 6/2003 | Popovich et al. |
| 6,583,550 B2 | 6/2003 | Iwasa et al. |
| 6,583,573 B2 | 6/2003 | Bierman |
| D477,093 S | 7/2003 | Moriyama et al. |
| 6,585,393 B1 | 7/2003 | Brandes et al. |
| 6,586,890 B2 | 7/2003 | Min et al. |
| 6,587,049 B1 | 7/2003 | Thacker |
| 6,590,343 B2 | 7/2003 | Pederson |
| 6,592,238 B2 | 7/2003 | Cleaver et al. |

(56) References Cited

U.S. PATENT DOCUMENTS

| | | |
|---|---|---|
| 6,594,369 B1 | 7/2003 | Une |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,609,813 B1 | 8/2003 | Showers et al. |
| 6,612,712 B2 | 9/2003 | Nepil |
| 6,612,717 B2 | 9/2003 | Yen |
| 6,612,729 B1 | 9/2003 | Hoffman |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,652,117 B2 | 11/2003 | Tsai |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Wynne Willson |
| 6,679,621 B1 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,736,328 B1 | 5/2004 | Takusagawa |
| 6,736,525 B2 | 5/2004 | Chin |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,768,047 B2 | 7/2004 | Chang et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,796,680 B1 | 9/2004 | Showers et al. |
| 6,799,864 B2 | 10/2004 | Bohler et al. |
| 6,801,003 B2 | 10/2004 | Schanberger et al. |
| 6,803,732 B2 | 10/2004 | Kraus et al. |
| 6,806,659 B1 | 10/2004 | Mueller et al. |
| 6,812,970 B1 | 11/2004 | McBride |
| 6,814,470 B2 | 11/2004 | Rizkin et al. |
| 6,814,478 B2 | 11/2004 | Menke |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,150 B2 | 2/2005 | Clauberg et al. |
| 6,853,151 B2 | 2/2005 | Leong et al. |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 | 3/2005 | Morgan et al. |
| 6,871,981 B2 | 3/2005 | Alexanderson et al. |
| 6,874,924 B1 | 4/2005 | Hulse et al. |
| 6,879,883 B1 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| D506,274 S | 6/2005 | Moriyama et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,926,419 B2 | 8/2005 | An |
| 6,936,968 B2 | 8/2005 | Cross et al. |
| 6,936,978 B2 | 8/2005 | Morgan et al. |
| 6,940,230 B2 | 9/2005 | Myron et al. |
| 6,948,829 B2 | 9/2005 | Verdes et al. |
| 6,953,261 B1 | 10/2005 | Jiao et al. |
| 6,957,905 B1 | 10/2005 | Pritchard et al. |
| 6,963,175 B2 | 11/2005 | Archenhold et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 | 11/2005 | Morgan et al. |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |
| 6,982,518 B2 | 1/2006 | Chou et al. |
| 6,995,681 B2 | 2/2006 | Pederson |
| 6,997,576 B1 | 2/2006 | Lodhie et al. |
| 6,999,318 B2 | 2/2006 | Newby |
| 7,004,603 B2 | 2/2006 | Knight |
| D518,218 S | 3/2006 | Roberge et al. |
| 7,008,079 B2 | 3/2006 | Smith |
| 7,014,336 B1 | 3/2006 | Ducharme et al. |
| 7,015,650 B2 | 3/2006 | McGrath |
| 7,018,063 B2 | 3/2006 | Michael et al. |
| 7,018,074 B2 | 3/2006 | Raby et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,029,145 B2 | 4/2006 | Frederick |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |
| 7,049,761 B2 | 5/2006 | Timmermans et al. |
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 | 6/2006 | Leong et al. |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |
| 7,088,904 B2 | 8/2006 | Ryan, Jr. |
| 7,102,902 B1 | 9/2006 | Brown et al. |
| 7,113,541 B1 | 9/2006 | Lys et al. |
| 7,114,830 B2 | 10/2006 | Robertson et al. |
| 7,114,834 B2 | 10/2006 | Rivas et al. |
| 7,118,262 B2 | 10/2006 | Negley |
| 7,119,503 B2 | 10/2006 | Kemper |
| 7,120,560 B2 | 10/2006 | Williams et al. |
| 7,121,679 B2 | 10/2006 | Fujimoto |
| 7,122,976 B1 | 10/2006 | Null et al. |
| 7,123,139 B2 | 10/2006 | Sweeney |
| 7,128,442 B2 | 10/2006 | Lee et al. |
| 7,128,454 B2 | 10/2006 | Kim et al. |
| D532,532 S | 11/2006 | Maxik |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,144,135 B2 | 12/2006 | Martin et al. |
| 7,153,002 B2 | 12/2006 | Kim et al. |
| 7,161,311 B2 | 1/2007 | Mueller et al. |

(56) References Cited

U.S. PATENT DOCUMENTS

| | | |
|---|---|---|
| 7,161,313 B2 | 1/2007 | Piepgras et al. |
| 7,161,556 B2 | 1/2007 | Morgan et al. |
| 7,164,110 B2 | 1/2007 | Pitigoi-Aron et al. |
| 7,164,235 B2 | 1/2007 | Ito et al. |
| 7,165,863 B1 | 1/2007 | Thomas et al. |
| 7,165,866 B2 | 1/2007 | Li |
| 7,167,777 B2 | 1/2007 | Budike, Jr. |
| 7,168,843 B2 | 1/2007 | Striebel |
| D536,468 S | 2/2007 | Crosby |
| 7,178,941 B2 | 2/2007 | Roberge et al. |
| 7,180,252 B2 | 2/2007 | Lys et al. |
| D538,950 S | 3/2007 | Maxik |
| D538,952 S | 3/2007 | Maxik et al. |
| D538,962 S | 3/2007 | Elliott |
| 7,186,003 B2 | 3/2007 | Dowling et al. |
| 7,186,005 B2 | 3/2007 | Hulse |
| 7,187,141 B2 | 3/2007 | Mueller et al. |
| 7,190,126 B1 | 3/2007 | Paton |
| 7,192,154 B2 | 3/2007 | Becker |
| 7,198,387 B1 | 4/2007 | Gloisten et al. |
| 7,201,491 B2 | 4/2007 | Bayat et al. |
| 7,201,497 B2 | 4/2007 | Weaver, Jr. et al. |
| 7,202,613 B2 | 4/2007 | Morgan et al. |
| 7,204,615 B2 | 4/2007 | Arik et al. |
| 7,204,622 B2 | 4/2007 | Dowling et al. |
| 7,207,696 B1 | 4/2007 | Lin |
| 7,210,818 B2 | 5/2007 | Luk et al. |
| 7,210,957 B2 | 5/2007 | Mrakovich et al. |
| 7,211,959 B1 | 5/2007 | Chou |
| 7,213,934 B2 | 5/2007 | Zarian et al. |
| 7,217,004 B2 | 5/2007 | Park et al. |
| 7,217,012 B2 | 5/2007 | Southard et al. |
| 7,217,022 B2 | 5/2007 | Ruffin |
| 7,218,056 B1 | 5/2007 | Harwood |
| 7,218,238 B2 | 5/2007 | Right et al. |
| 7,220,015 B2 | 5/2007 | Dowling |
| 7,220,018 B2 | 5/2007 | Crabb et al. |
| 7,221,104 B2 | 5/2007 | Lys et al. |
| 7,221,110 B2 | 5/2007 | Sears et al. |
| 7,224,000 B2 | 5/2007 | Aanegola et al. |
| 7,226,189 B2 | 6/2007 | Lee et al. |
| 7,228,052 B1 | 6/2007 | Lin |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,237,924 B2 | 7/2007 | Martineau et al. |
| 7,237,925 B2 | 7/2007 | Mayer et al. |
| 7,239,532 B1 | 7/2007 | Hsu et al. |
| 7,241,038 B2 | 7/2007 | Naniwa et al. |
| 7,242,152 B2 | 7/2007 | Dowling et al. |
| 7,244,058 B2 | 7/2007 | DiPenti et al. |
| 7,246,926 B2 | 7/2007 | Harwood |
| 7,246,931 B2 | 7/2007 | Hsieh et al. |
| 7,248,239 B2 | 7/2007 | Dowling et al. |
| 7,249,269 B1 | 7/2007 | Motoyama |
| 7,249,865 B2 | 7/2007 | Robertson |
| D548,868 S | 8/2007 | Roberge et al. |
| 7,252,408 B2 | 8/2007 | Mazzochette et al. |
| 7,253,566 B2 | 8/2007 | Lys et al. |
| 7,255,457 B2 | 8/2007 | Ducharme et al. |
| 7,255,460 B2 | 8/2007 | Lee |
| 7,256,554 B2 | 8/2007 | Lys |
| 7,258,458 B2 | 8/2007 | Mochiachvili et al. |
| 7,258,467 B2 | 8/2007 | Saccomanno et al. |
| 7,259,528 B2 | 8/2007 | Pilz |
| 7,262,439 B2 | 8/2007 | Setlur et al. |
| 7,262,559 B2 | 8/2007 | Tripathi et al. |
| D550,379 S | 9/2007 | Hoshikawa et al. |
| 7,264,372 B2 | 9/2007 | Maglica |
| 7,267,467 B2 | 9/2007 | Wu et al. |
| 7,270,443 B2 | 9/2007 | Kurtz et al. |
| 7,271,794 B1 | 9/2007 | Cheng et al. |
| 7,273,300 B2 | 9/2007 | Mrakovich |
| 7,274,045 B2 | 9/2007 | Chandran et al. |
| 7,274,160 B2 | 9/2007 | Mueller et al. |
| 7,274,183 B1 | 9/2007 | Gu et al. |
| D553,267 S | 10/2007 | Yuen |
| 7,285,801 B2 | 10/2007 | Eliashevich et al. |
| 7,288,902 B1 | 10/2007 | Melanson |
| 7,288,904 B2 | 10/2007 | Numeroli et al. |
| 7,296,912 B2 | 11/2007 | Beauchamp |
| 7,300,184 B2 | 11/2007 | Ichikawa et al. |
| 7,300,192 B2 | 11/2007 | Mueller et al. |
| D556,937 S | 12/2007 | Ly |
| D557,854 S | 12/2007 | Lewis |
| 7,303,300 B2 | 12/2007 | Dowling et al. |
| 7,306,353 B2 | 12/2007 | Popovich et al. |
| 7,307,391 B2 | 12/2007 | Shan |
| 7,308,296 B2 | 12/2007 | Lys et al. |
| 7,309,965 B2 | 12/2007 | Dowling et al. |
| 7,318,658 B2 | 1/2008 | Wang et al. |
| 7,319,244 B2 | 1/2008 | Liu et al. |
| 7,319,246 B2 | 1/2008 | Soules et al. |
| 7,321,191 B2 | 1/2008 | Setlur et al. |
| 7,326,964 B2 | 2/2008 | Lim et al. |
| 7,327,281 B2 | 2/2008 | Hutchison |
| 7,329,024 B2 | 2/2008 | Lynch et al. |
| 7,329,031 B2 | 2/2008 | Liaw et al. |
| D563,589 S | 3/2008 | Hariri et al. |
| 7,344,278 B2 | 3/2008 | Paravantsos |
| 7,345,320 B2 | 3/2008 | Dahm |
| 7,348,604 B2 | 3/2008 | Matheson |
| 7,350,936 B2 | 4/2008 | Ducharme et al. |
| 7,350,952 B2 | 4/2008 | Nishigaki |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,358,929 B2 | 4/2008 | Mueller et al. |
| 7,370,986 B2 | 5/2008 | Chan |
| 7,374,327 B2 | 5/2008 | Schexnaider |
| 7,378,805 B2 | 5/2008 | Oh et al. |
| 7,378,976 B1 | 5/2008 | Paterno |
| 7,385,359 B2 | 6/2008 | Dowling et al. |
| 7,391,159 B2 | 6/2008 | Harwood |
| D574,093 S | 7/2008 | Kitagawa et al. |
| 7,396,142 B2 | 7/2008 | Laizure, Jr. et al. |
| 7,396,146 B2 | 7/2008 | Wang |
| 7,401,935 B2 | 7/2008 | VanderSchuit |
| 7,401,945 B2 | 7/2008 | Zhang |
| D576,749 S | 9/2008 | Kitagawa et al. |
| 7,423,548 B2 | 9/2008 | Kontovich |
| 7,427,840 B2 | 9/2008 | Morgan et al. |
| 7,429,117 B2 | 9/2008 | Pohlert et al. |
| 7,434,964 B1 | 10/2008 | Zheng et al. |
| 7,438,441 B2 | 10/2008 | Sun et al. |
| D580,089 S | 11/2008 | Ly et al. |
| D581,556 S | 11/2008 | To et al. |
| 7,449,847 B2 | 11/2008 | Schanberger et al. |
| D582,577 S | 12/2008 | Yuen |
| 7,466,082 B1 | 12/2008 | Snyder et al. |
| 7,470,046 B2 | 12/2008 | Kao et al. |
| D584,428 S | 1/2009 | Li et al. |
| D584,429 S | 1/2009 | Pei et al. |
| 7,476,002 B2 | 1/2009 | Wolf et al. |
| 7,476,004 B2 | 1/2009 | Chan |
| 7,478,924 B2 | 1/2009 | Robertson |
| 7,482,764 B2 | 1/2009 | Morgan et al. |
| D586,484 S | 2/2009 | Liu et al. |
| D586,928 S | 2/2009 | Liu et al. |
| 7,490,957 B2 | 2/2009 | Leong et al. |
| 7,494,246 B2 | 2/2009 | Harbers et al. |
| 7,497,596 B2 | 3/2009 | Ge |
| 7,498,753 B2 | 3/2009 | McAvoy et al. |
| 7,507,001 B2 | 3/2009 | Kit |
| 7,510,299 B2 | 3/2009 | Timmermans et al. |
| 7,510,400 B2 | 3/2009 | Glovatsky et al. |
| 7,511,613 B2 | 3/2009 | Wang |
| 7,514,876 B2 | 4/2009 | Roach, Jr. |
| 7,520,635 B2 | 4/2009 | Wolf et al. |
| 7,521,872 B2 | 4/2009 | Bruning |
| 7,524,089 B2 | 4/2009 | Park |

(56) References Cited

U.S. PATENT DOCUMENTS

| | | |
|---|---|---|
| D592,766 S | 5/2009 | Zhu et al. |
| D593,223 S | 5/2009 | Komar |
| 7,530,701 B2 | 5/2009 | Chan-Wing |
| 7,534,002 B2 | 5/2009 | Yamaguchi et al. |
| D594,999 S | 6/2009 | Uchida et al. |
| 7,549,769 B2 | 6/2009 | Kim et al. |
| 7,556,396 B2 | 7/2009 | Kuo et al. |
| 7,559,663 B2 | 7/2009 | Wong et al. |
| 7,562,998 B1 | 7/2009 | Yen |
| D597,686 S | 8/2009 | Noh |
| 7,569,981 B1 | 8/2009 | Ciancanelli |
| 7,572,030 B2 | 8/2009 | Booth et al. |
| 7,575,339 B2 | 8/2009 | Hung |
| 7,579,786 B2 | 8/2009 | Soos |
| 7,583,035 B2 | 9/2009 | Shteynberg et al. |
| 7,583,901 B2 | 9/2009 | Nakagawa et al. |
| 7,592,757 B2 | 9/2009 | Hargenrader et al. |
| 7,594,738 B1 | 9/2009 | Lin et al. |
| D601,726 S | 10/2009 | Mollaert et al. |
| 7,598,681 B2 | 10/2009 | Lys et al. |
| 7,598,684 B2 | 10/2009 | Lys et al. |
| 7,600,907 B2 | 10/2009 | Liu et al. |
| 7,602,559 B2 | 10/2009 | Jang et al. |
| 7,616,849 B1 | 11/2009 | Simon |
| 7,618,157 B1 | 11/2009 | Galvez et al. |
| 7,619,366 B2 | 11/2009 | Diederiks |
| 7,635,201 B2 | 12/2009 | Deng |
| 7,635,214 B2 | 12/2009 | Perlo |
| 7,639,517 B2 | 12/2009 | Zhou et al. |
| 7,648,251 B2 | 1/2010 | Whitehouse et al. |
| 7,649,327 B2 | 1/2010 | Peng |
| D610,724 S | 2/2010 | Chiang et al. |
| 7,654,703 B2 | 2/2010 | Kan et al. |
| 7,661,839 B2 | 2/2010 | Tsai |
| D611,172 S | 3/2010 | Lin et al. |
| D612,528 S | 3/2010 | McGrath et al. |
| 7,690,813 B2 | 4/2010 | Kanamori et al. |
| 7,710,047 B2 | 5/2010 | Shteynberg et al. |
| 7,710,253 B1 | 5/2010 | Fredricks |
| 7,712,918 B2 | 5/2010 | Siemiet et al. |
| 7,748,886 B2 | 7/2010 | Pazula et al. |
| 7,758,207 B1 | 7/2010 | Zhou et al. |
| 7,759,881 B1 | 7/2010 | Melanson |
| D621,975 S | 8/2010 | Wang |
| 7,784,966 B2 | 8/2010 | Verfuerth et al. |
| 7,800,511 B1 | 9/2010 | Hutchison et al. |
| 7,815,338 B2 | 10/2010 | Siemiet et al. |
| 7,815,341 B2 | 10/2010 | Steedly et al. |
| 7,828,471 B2 | 11/2010 | Lin |
| 7,843,150 B2 | 11/2010 | Wang et al. |
| 7,848,702 B2 | 12/2010 | Ho et al. |
| 7,850,341 B2 | 12/2010 | Mrakovich et al. |
| 7,855,641 B1 | 12/2010 | Okafo |
| RE42,161 E | 2/2011 | Hochstein |
| 7,878,683 B2 | 2/2011 | Logan et al. |
| 7,887,216 B2 | 2/2011 | Patrick |
| 7,887,226 B2 | 2/2011 | Huang et al. |
| 7,889,051 B1 | 2/2011 | Billig et al. |
| D634,452 S | 3/2011 | de Visser |
| 7,904,209 B2 | 3/2011 | Podgorny et al. |
| D636,504 S | 4/2011 | Duster |
| 7,926,975 B2 | 4/2011 | Siemiet et al. |
| 7,938,562 B2 | 5/2011 | Ivey et al. |
| 7,946,729 B2 | 5/2011 | Ivey et al. |
| 7,952,292 B2 | 5/2011 | Vegter et al. |
| 7,976,185 B2 | 7/2011 | Uang et al. |
| 7,976,196 B2 | 7/2011 | Ivey et al. |
| 7,990,070 B2 | 8/2011 | Nerone |
| 7,997,770 B1 | 8/2011 | Meurer |
| 8,013,472 B2 | 9/2011 | Adest et al. |
| D650,097 S | 12/2011 | Trumble et al. |
| D650,494 S | 12/2011 | Tsao et al. |
| D652,968 S | 1/2012 | Aguiar et al. |
| 8,093,823 B1 | 1/2012 | Ivey et al. |
| D654,192 S | 2/2012 | Maxik et al. |
| 8,118,447 B2 | 2/2012 | Simon et al. |
| 8,136,738 B1 | 3/2012 | Kopp |
| 8,147,091 B2 | 4/2012 | Hsia et al. |
| 8,159,152 B1 | 4/2012 | Salessi |
| D660,472 S | 5/2012 | Aguiar et al. |
| 8,167,452 B2 | 5/2012 | Chou |
| 8,177,388 B2 | 5/2012 | Yen |
| 8,179,037 B2 | 5/2012 | Chan et al. |
| 8,183,989 B2 | 5/2012 | Tsai |
| D662,236 S | 6/2012 | Matsushita |
| 8,203,445 B2 | 6/2012 | Recker et al. |
| 8,214,084 B2 | 7/2012 | Ivey et al. |
| 8,230,690 B1 | 7/2012 | Salessi |
| 8,247,985 B2 | 8/2012 | Timmermans et al. |
| 8,251,544 B2 | 8/2012 | Ivey et al. |
| 8,262,249 B2 | 9/2012 | Hsia et al. |
| 8,272,764 B2 | 9/2012 | Son |
| 8,287,144 B2 | 10/2012 | Pedersen et al. |
| 8,297,788 B2 | 10/2012 | Bishop |
| 8,299,722 B2 | 10/2012 | Melanson |
| 8,304,993 B2 | 11/2012 | Tzou et al. |
| 8,313,213 B2 | 11/2012 | Lin et al. |
| 8,319,407 B2 | 11/2012 | Ke |
| 8,319,433 B2 | 11/2012 | Lin et al. |
| 8,319,437 B2 | 11/2012 | Carlin et al. |
| 8,322,878 B2 | 12/2012 | Hsia et al. |
| 8,324,817 B2 | 12/2012 | Ivey et al. |
| 8,337,071 B2 | 12/2012 | Negley et al. |
| 8,366,291 B2 | 2/2013 | Hoffmann |
| 8,376,579 B2 | 2/2013 | Chang |
| 8,376,588 B2 | 2/2013 | Yen |
| 8,382,322 B2 | 2/2013 | Bishop |
| 8,382,327 B2 | 2/2013 | Timmermans et al. |
| 8,382,502 B2 | 2/2013 | Cao et al. |
| 8,388,179 B2 | 3/2013 | Hood et al. |
| 8,398,275 B2 | 3/2013 | Wang et al. |
| 8,403,692 B2 | 3/2013 | Cao et al. |
| 8,405,314 B2 | 3/2013 | Jensen |
| 8,434,914 B2 | 5/2013 | Li et al. |
| 8,454,193 B2 | 6/2013 | Simon et al. |
| 8,496,351 B2 | 7/2013 | Lo et al. |
| 8,523,394 B2 | 9/2013 | Simon et al. |
| 8,531,109 B2 | 9/2013 | Visser et al. |
| 8,540,401 B2 | 9/2013 | Simon et al. |
| 8,571,716 B2 | 10/2013 | Ivey et al. |
| 8,628,216 B2 | 1/2014 | Ivey et al. |
| 8,653,984 B2 | 2/2014 | Ivey et al. |
| 8,674,626 B2 | 3/2014 | Siemiet et al. |
| 8,807,785 B2 | 8/2014 | Ivey et al. |
| 8,830,080 B2 | 9/2014 | Ivey et al. |
| 8,840,282 B2 | 9/2014 | Simon et al. |
| 8,870,412 B1 | 10/2014 | Timmermans et al. |
| 8,870,415 B2 | 10/2014 | Ivey |
| 9,016,895 B2 | 4/2015 | Handsaker |
| 9,072,171 B2 | 6/2015 | Simon |
| 9,101,026 B2 | 8/2015 | Ivey et al. |
| 9,163,794 B2 | 10/2015 | Simon et al. |
| 9,184,518 B2 | 11/2015 | Ivey et al. |
| 2001/0033488 A1 | 10/2001 | Chliwnyj et al. |
| 2001/0045803 A1 | 11/2001 | Cencur |
| 2002/0011801 A1 | 1/2002 | Chang |
| 2002/0015297 A1 | 2/2002 | Hayashi et al. |
| 2002/0038157 A1 | 3/2002 | Dowling et al. |
| 2002/0041159 A1 | 4/2002 | Kaping, Jr. |
| 2002/0044066 A1 | 4/2002 | Dowling et al. |
| 2002/0047516 A1 | 4/2002 | Iwasa et al. |
| 2002/0047569 A1 | 4/2002 | Dowling et al. |
| 2002/0047624 A1 | 4/2002 | Stam et al. |
| 2002/0047628 A1 | 4/2002 | Morgan et al. |
| 2002/0048169 A1 | 4/2002 | Dowling et al. |
| 2002/0057061 A1 | 5/2002 | Mueller et al. |
| 2002/0060526 A1 | 5/2002 | Timmermans et al. |
| 2002/0070688 A1 | 6/2002 | Dowling et al. |
| 2002/0074559 A1 | 6/2002 | Dowling et al. |
| 2002/0074958 A1 | 6/2002 | Crenshaw |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |

(56) References Cited

U.S. PATENT DOCUMENTS

| | | |
|---|---|---|
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0152298 A1 | 10/2002 | Kikta et al. |
| 2002/0153851 A1 | 10/2002 | Morgan et al. |
| 2002/0158583 A1 | 10/2002 | Lys et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176253 A1 | 11/2002 | Lee |
| 2002/0176259 A1 | 11/2002 | Ducharme |
| 2002/0179816 A1 | 12/2002 | Haines et al. |
| 2002/0195975 A1 | 12/2002 | Schanberger et al. |
| 2003/0011538 A1 | 1/2003 | Lys et al. |
| 2003/0021117 A1 | 1/2003 | Chan |
| 2003/0028260 A1 | 2/2003 | Blackwell |
| 2003/0031015 A1 | 2/2003 | Ishibashi |
| 2003/0048641 A1 | 3/2003 | Alexanderson et al. |
| 2003/0052599 A1 | 3/2003 | Sun |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0085710 A1 | 5/2003 | Bourgault et al. |
| 2003/0095404 A1 | 5/2003 | Becks et al. |
| 2003/0100837 A1 | 5/2003 | Lys et al. |
| 2003/0102810 A1 | 6/2003 | Cross et al. |
| 2003/0133292 A1 | 7/2003 | Mueller et al. |
| 2003/0137258 A1 | 7/2003 | Piepgras et al. |
| 2003/0185005 A1 | 10/2003 | Sommers et al. |
| 2003/0185014 A1 | 10/2003 | Gloisten |
| 2003/0189412 A1 | 10/2003 | Cunningham |
| 2003/0218879 A1 | 11/2003 | Tieszen |
| 2003/0222578 A1 | 12/2003 | Cok |
| 2003/0222587 A1 | 12/2003 | Dowling, Jr. et al. |
| 2003/0234342 A1 | 12/2003 | Gaines et al. |
| 2004/0003545 A1 | 1/2004 | Gillespie |
| 2004/0007980 A1 | 1/2004 | Shibata |
| 2004/0012959 A1 | 1/2004 | Robertson et al. |
| 2004/0036006 A1 | 2/2004 | Dowling |
| 2004/0037088 A1 | 2/2004 | English et al. |
| 2004/0052076 A1 | 3/2004 | Mueller et al. |
| 2004/0062041 A1 | 4/2004 | Cross et al. |
| 2004/0075572 A1 | 4/2004 | Buschmann et al. |
| 2004/0080960 A1 | 4/2004 | Wu |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0113568 A1 | 6/2004 | Dowling et al. |
| 2004/0114371 A1 | 6/2004 | Lea et al. |
| 2004/0116039 A1 | 6/2004 | Mueller et al. |
| 2004/0124782 A1 | 7/2004 | Yu |
| 2004/0130908 A1 | 7/2004 | McClurg et al. |
| 2004/0130909 A1 | 7/2004 | Mueller et al. |
| 2004/0141321 A1 | 7/2004 | Dowling et al. |
| 2004/0145886 A1 | 7/2004 | Fatemi et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0189262 A1 | 9/2004 | McGrath |
| 2004/0212320 A1 | 10/2004 | Dowling et al. |
| 2004/0212321 A1 * | 10/2004 | Lys ................ F21K 9/135 315/291 |
| 2004/0212993 A1 | 10/2004 | Morgan et al. |
| 2004/0223328 A1 | 11/2004 | Lee et al. |
| 2004/0240890 A1 | 12/2004 | Lys et al. |
| 2004/0251854 A1 | 12/2004 | Matsuda et al. |
| 2004/0257007 A1 | 12/2004 | Lys et al. |
| 2005/0013133 A1 | 1/2005 | Yeh |
| 2005/0023536 A1 | 2/2005 | Shackle |
| 2005/0024877 A1 | 2/2005 | Frederick |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0043907 A1 | 2/2005 | Eckel et al. |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0078477 A1 | 4/2005 | Lo |
| 2005/0093488 A1 | 5/2005 | Hung et al. |
| 2005/0099824 A1 | 5/2005 | Dowling et al. |
| 2005/0107694 A1 | 5/2005 | Jansen et al. |
| 2005/0110384 A1 | 5/2005 | Peterson |
| 2005/0116667 A1 | 6/2005 | Mueller et al. |
| 2005/0128751 A1 | 6/2005 | Roberge et al. |
| 2005/0141225 A1 | 6/2005 | Striebel |
| 2005/0143173 A1 * | 6/2005 | Barney ................ A63F 13/235 463/37 |
| 2005/0151489 A1 | 7/2005 | Lys et al. |
| 2005/0151663 A1 | 7/2005 | Tanguay |
| 2005/0154494 A1 | 7/2005 | Ahmed |
| 2005/0162093 A1 | 7/2005 | Timmermans et al. |
| 2005/0162100 A1 | 7/2005 | Romano et al. |
| 2005/0162101 A1 | 7/2005 | Leong et al. |
| 2005/0174473 A1 | 8/2005 | Morgan et al. |
| 2005/0174780 A1 | 8/2005 | Park |
| 2005/0184667 A1 | 8/2005 | Sturman et al. |
| 2005/0201112 A1 | 9/2005 | Machi et al. |
| 2005/0206529 A1 | 9/2005 | St.-Germain |
| 2005/0213320 A1 | 9/2005 | Kazuhiro et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219860 A1 | 10/2005 | Schexnaider |
| 2005/0219872 A1 | 10/2005 | Lys |
| 2005/0225979 A1 | 10/2005 | Robertson et al. |
| 2005/0231133 A1 | 10/2005 | Lys |
| 2005/0236029 A1 | 10/2005 | Dowling |
| 2005/0236998 A1 | 10/2005 | Mueller et al. |
| 2005/0242742 A1 | 11/2005 | Cheang et al. |
| 2005/0243577 A1 | 11/2005 | Moon |
| 2005/0248299 A1 | 11/2005 | Chemel et al. |
| 2005/0253533 A1 | 11/2005 | Lys et al. |
| 2005/0259424 A1 | 11/2005 | Zampini et al. |
| 2005/0264474 A1 | 12/2005 | Rast |
| 2005/0265019 A1 | 12/2005 | Sommers et al. |
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0281030 A1 | 12/2005 | Leong et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0044152 A1 | 3/2006 | Wang |
| 2006/0050509 A9 | 3/2006 | Dowling et al. |
| 2006/0050514 A1 | 3/2006 | Opolka |
| 2006/0056855 A1 | 3/2006 | Nakagawa et al. |
| 2006/0066447 A1 | 3/2006 | Davenport et al. |
| 2006/0076908 A1 | 4/2006 | Morgan et al. |
| 2006/0081863 A1 | 4/2006 | Kim et al. |
| 2006/0091826 A1 | 5/2006 | Chen |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |

(56) References Cited

U.S. PATENT DOCUMENTS

| | | |
|---|---|---|
| 2006/0126338 A1 | 6/2006 | Mighetto |
| 2006/0132061 A1 | 6/2006 | McCormick et al. |
| 2006/0132323 A1 | 6/2006 | Grady |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0196953 A1 | 9/2006 | Simon et al. |
| 2006/0197661 A1 | 9/2006 | Tracy et al. |
| 2006/0198128 A1 | 9/2006 | Piepgras et al. |
| 2006/0208667 A1 | 9/2006 | Lys et al. |
| 2006/0215422 A1 | 9/2006 | Laizure et al. |
| 2006/0220595 A1 | 10/2006 | Lu |
| 2006/0221606 A1 | 10/2006 | Dowling |
| 2006/0221619 A1 | 10/2006 | Nishigaki |
| 2006/0227558 A1 | 10/2006 | Osawa et al. |
| 2006/0232974 A1 | 10/2006 | Lee et al. |
| 2006/0238884 A1 | 10/2006 | Jang et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0265921 A1 | 11/2006 | Korall et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0035538 A1 | 2/2007 | Garcia et al. |
| 2007/0035965 A1 | 2/2007 | Holst |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0057805 A1 | 3/2007 | Gomez |
| 2007/0064419 A1 | 3/2007 | Gandhi |
| 2007/0064425 A1 | 3/2007 | Frecska et al. |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0109782 A1 | 5/2007 | Wolf et al. |
| 2007/0115658 A1 | 5/2007 | Mueller et al. |
| 2007/0115665 A1 | 5/2007 | Mueller et al. |
| 2007/0120463 A1 | 5/2007 | Hayashi et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0146126 A1 | 6/2007 | Wang |
| 2007/0147046 A1 | 6/2007 | Arik et al. |
| 2007/0152797 A1 | 7/2007 | Chemel et al. |
| 2007/0152808 A1 | 7/2007 | LaCasse |
| 2007/0153514 A1 | 7/2007 | Dowling et al. |
| 2007/0159828 A1 | 7/2007 | Wang |
| 2007/0165402 A1 | 7/2007 | Weaver et al. |
| 2007/0165405 A1 | 7/2007 | Chen |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0200725 A1 | 8/2007 | Fredericks et al. |
| 2007/0205712 A1 | 9/2007 | Radkov et al. |
| 2007/0206375 A1 | 9/2007 | Piepgras et al. |
| 2007/0211461 A1 | 9/2007 | Harwood |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0236358 A1 | 10/2007 | Street et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247450 A1 | 10/2007 | Lee |
| 2007/0247842 A1 | 10/2007 | Zampini et al. |
| 2007/0247847 A1 | 10/2007 | Villard |
| 2007/0247851 A1 | 10/2007 | Villard |
| 2007/0252161 A1 | 11/2007 | Meis et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0024067 A1 | 1/2008 | Ishibashi |
| 2008/0029720 A1 | 2/2008 | Li |
| 2008/0037226 A1 | 2/2008 | Shin et al. |
| 2008/0037245 A1 | 2/2008 | Chan |
| 2008/0037284 A1 | 2/2008 | Rudisill |
| 2008/0049434 A1 | 2/2008 | Marsh |
| 2008/0055894 A1 | 3/2008 | Deng |
| 2008/0062680 A1 | 3/2008 | Timmermans et al. |
| 2008/0068838 A1 | 3/2008 | Galke et al. |
| 2008/0068839 A1 | 3/2008 | Matheson |
| 2008/0074872 A1 | 3/2008 | Panotopoulos |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094819 A1 | 4/2008 | Vaish |
| 2008/0094837 A1 | 4/2008 | Dobbins et al. |
| 2008/0129211 A1 | 6/2008 | Lin et al. |
| 2008/0130267 A1 | 6/2008 | Dowling et al. |
| 2008/0150444 A1 | 6/2008 | Usui et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0185961 A1 | 8/2008 | Hong |
| 2008/0186704 A1 | 8/2008 | Chou et al. |
| 2008/0192436 A1 | 8/2008 | Peng et al. |
| 2008/0198598 A1 | 8/2008 | Ward |
| 2008/0211386 A1 | 9/2008 | Choi et al. |
| 2008/0211419 A1 | 9/2008 | Garrity |
| 2008/0218993 A1 | 9/2008 | Li |
| 2008/0224629 A1 | 9/2008 | Melanson |
| 2008/0224636 A1 | 9/2008 | Melanson |
| 2008/0253125 A1 | 10/2008 | Kang et al. |
| 2008/0258631 A1 | 10/2008 | Wu et al. |
| 2008/0258647 A1 | 10/2008 | Scianna |
| 2008/0265799 A1 | 10/2008 | Sibert |
| 2008/0278092 A1 | 11/2008 | Lys et al. |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0298080 A1 | 12/2008 | Wu et al. |

(56) References Cited

U.S. PATENT DOCUMENTS

| | | |
|---|---|---|
| 2008/0304249 A1 | 12/2008 | Davey et al. |
| 2008/0310119 A1 | 12/2008 | Giacoma |
| 2008/0315773 A1 | 12/2008 | Pang |
| 2008/0315784 A1 | 12/2008 | Tseng |
| 2009/0002995 A1 | 1/2009 | Lee et al. |
| 2009/0010022 A1 | 1/2009 | Tsai |
| 2009/0016063 A1 | 1/2009 | Hu |
| 2009/0016068 A1 | 1/2009 | Chang |
| 2009/0018954 A1 | 1/2009 | Roberts |
| 2009/0021140 A1 | 1/2009 | Takasu et al. |
| 2009/0032604 A1 | 2/2009 | Miller |
| 2009/0033513 A1 | 2/2009 | Salsbury et al. |
| 2009/0046473 A1 | 2/2009 | Tsai et al. |
| 2009/0052186 A1 | 2/2009 | Xue |
| 2009/0059557 A1 | 3/2009 | Tanaka |
| 2009/0059559 A1 | 3/2009 | Pabst et al. |
| 2009/0059603 A1 | 3/2009 | Recker et al. |
| 2009/0065596 A1 | 3/2009 | Seem et al. |
| 2009/0067170 A1 | 3/2009 | Bloemen et al. |
| 2009/0067182 A1 | 3/2009 | Hsu et al. |
| 2009/0072945 A1 | 3/2009 | Pan et al. |
| 2009/0073693 A1 | 3/2009 | Nall et al. |
| 2009/0085500 A1 | 4/2009 | Zampini, II et al. |
| 2009/0086492 A1 | 4/2009 | Meyer |
| 2009/0091929 A1 | 4/2009 | Faubion |
| 2009/0091938 A1 | 4/2009 | Jacobson et al. |
| 2009/0101930 A1 | 4/2009 | Li |
| 2009/0115597 A1 | 5/2009 | Giacalone |
| 2009/0122571 A1* | 5/2009 | Simmons ............ B60Q 1/0023 362/546 |
| 2009/0139690 A1 | 6/2009 | Maerz et al. |
| 2009/0140285 A1 | 6/2009 | Lin et al. |
| 2009/0175041 A1 | 7/2009 | Yuen et al. |
| 2009/0185373 A1 | 7/2009 | Grajcar |
| 2009/0195186 A1 | 8/2009 | Guest et al. |
| 2009/0196034 A1 | 8/2009 | Gherardini et al. |
| 2009/0213588 A1 | 8/2009 | Manes |
| 2009/0219713 A1 | 9/2009 | Siemiet et al. |
| 2009/0231831 A1 | 9/2009 | Hsiao et al. |
| 2009/0268461 A1 | 10/2009 | Deak et al. |
| 2009/0273924 A1 | 11/2009 | Chiang |
| 2009/0273926 A1 | 11/2009 | Deng |
| 2009/0284169 A1 | 11/2009 | Valois |
| 2009/0290334 A1 | 11/2009 | Ivey et al. |
| 2009/0295776 A1 | 12/2009 | Yu et al. |
| 2009/0296017 A1 | 12/2009 | Itoh et al. |
| 2009/0296381 A1 | 12/2009 | Dubord |
| 2009/0302730 A1 | 12/2009 | Carroll et al. |
| 2009/0303720 A1 | 12/2009 | McGrath |
| 2009/0316408 A1 | 12/2009 | Villard |
| 2010/0002453 A1 | 1/2010 | Wu et al. |
| 2010/0008085 A1 | 1/2010 | Ivey et al. |
| 2010/0019689 A1 | 1/2010 | Shan |
| 2010/0027259 A1 | 2/2010 | Simon et al. |
| 2010/0033095 A1 | 2/2010 | Sadwick |
| 2010/0033964 A1 | 2/2010 | Choi et al. |
| 2010/0046210 A1 | 2/2010 | Mathai et al. |
| 2010/0046222 A1 | 2/2010 | Yang |
| 2010/0061598 A1 | 3/2010 | Seo |
| 2010/0071946 A1 | 3/2010 | Hashimoto |
| 2010/0072904 A1 | 3/2010 | Eckel et al. |
| 2010/0073944 A1 | 3/2010 | Chen |
| 2010/0079085 A1 | 4/2010 | Wendt et al. |
| 2010/0096992 A1 | 4/2010 | Yamamoto et al. |
| 2010/0096998 A1 | 4/2010 | Beers |
| 2010/0103664 A1 | 4/2010 | Simon et al. |
| 2010/0103673 A1 | 4/2010 | Ivey et al. |
| 2010/0106306 A1 | 4/2010 | Simon et al. |
| 2010/0109550 A1 | 5/2010 | Huda et al. |
| 2010/0109558 A1 | 5/2010 | Chew |
| 2010/0141173 A1 | 6/2010 | Negrete |
| 2010/0148650 A1 | 6/2010 | Wu et al. |
| 2010/0149806 A1 | 6/2010 | Yiu |
| 2010/0157608 A1 | 6/2010 | Chen et al. |
| 2010/0164404 A1 | 7/2010 | Shao et al. |
| 2010/0177532 A1 | 7/2010 | Simon et al. |
| 2010/0181178 A1 | 7/2010 | Chang et al. |
| 2010/0201269 A1 | 8/2010 | Tzou et al. |
| 2010/0207547 A1 | 8/2010 | Kuroki et al. |
| 2010/0220469 A1 | 9/2010 | Ivey et al. |
| 2010/0237790 A1 | 9/2010 | Peng |
| 2010/0265732 A1 | 10/2010 | Liu |
| 2010/0270925 A1 | 10/2010 | Withers |
| 2010/0277069 A1 | 11/2010 | Janik et al. |
| 2010/0289418 A1 | 11/2010 | Langovsky |
| 2010/0308733 A1 | 12/2010 | Shao |
| 2010/0309652 A1 | 12/2010 | Shen et al. |
| 2010/0320922 A1 | 12/2010 | Palazzolo et al. |
| 2010/0327766 A1* | 12/2010 | Recker ............... H02J 9/02 315/291 |
| 2011/0006658 A1 | 1/2011 | Chan et al. |
| 2011/0090682 A1 | 4/2011 | Zheng et al. |
| 2011/0109454 A1 | 5/2011 | McSheffrey, Sr. et al. |
| 2011/0112661 A1 | 5/2011 | Jung et al. |
| 2011/0140136 A1 | 6/2011 | Daily et al. |
| 2011/0141745 A1 | 6/2011 | Gu et al. |
| 2011/0149564 A1 | 6/2011 | Hsia et al. |
| 2011/0156584 A1 | 6/2011 | Kim |
| 2011/0176298 A1 | 7/2011 | Meurer et al. |
| 2011/0199723 A1 | 8/2011 | Sato |
| 2011/0199769 A1 | 8/2011 | Bretschneider et al. |
| 2011/0204777 A1 | 8/2011 | Lenk |
| 2011/0260647 A1 | 10/2011 | Catalano et al. |
| 2011/0280010 A1 | 11/2011 | Ou et al. |
| 2011/0291588 A1 | 12/2011 | Tagare |
| 2012/0008314 A1 | 1/2012 | Simon et al. |
| 2012/0008315 A1 | 1/2012 | Simon et al. |
| 2012/0014086 A1 | 1/2012 | Jonsson |
| 2012/0043892 A1 | 2/2012 | Visser et al. |
| 2012/0063140 A1 | 3/2012 | Kong |
| 2012/0080994 A1 | 4/2012 | Chin et al. |
| 2012/0081891 A1 | 4/2012 | Tung et al. |
| 2012/0081894 A1 | 4/2012 | Simon et al. |
| 2012/0098439 A1 | 4/2012 | Recker et al. |
| 2012/0106144 A1 | 5/2012 | Chang |
| 2012/0106153 A1 | 5/2012 | Huang et al. |
| 2012/0113628 A1 | 5/2012 | Burrow et al. |
| 2012/0120660 A1 | 5/2012 | Grauvogel |
| 2012/0127726 A1 | 5/2012 | Yen |
| 2012/0139417 A1 | 6/2012 | Mironichev et al. |
| 2012/0146503 A1 | 6/2012 | Negley et al. |
| 2012/0146532 A1 | 6/2012 | Ivey et al. |
| 2012/0147597 A1 | 6/2012 | Farmer |
| 2012/0153865 A1 | 6/2012 | Rolfes et al. |
| 2012/0155073 A1 | 6/2012 | McCanless et al. |
| 2012/0161666 A1 | 6/2012 | Antony et al. |
| 2012/0194086 A1 | 8/2012 | Liu et al. |
| 2012/0195032 A1 | 8/2012 | Shew |
| 2012/0212951 A1 | 8/2012 | Lai et al. |
| 2012/0212953 A1 | 8/2012 | Bloom et al. |
| 2012/0230044 A1 | 9/2012 | Zhang et al. |
| 2012/0236533 A1 | 9/2012 | Nakamura et al. |
| 2012/0236554 A1 | 9/2012 | Rust |
| 2012/0243216 A1 | 9/2012 | Lai et al. |
| 2012/0243217 A1 | 9/2012 | Szprengiel et al. |
| 2012/0274214 A1 | 11/2012 | Radermacher et al. |
| 2012/0275154 A1 | 11/2012 | Hood et al. |
| 2012/0293991 A1 | 11/2012 | Lin |
| 2012/0293996 A1 | 11/2012 | Thomas et al. |
| 2012/0300409 A1 | 11/2012 | Lee |
| 2012/0300445 A1 | 11/2012 | Chu et al. |
| 2012/0300468 A1 | 11/2012 | Chang et al. |
| 2012/0300486 A1 | 11/2012 | Matsushita et al. |
| 2012/0307524 A1 | 12/2012 | Schapira et al. |
| 2012/0320598 A1 | 12/2012 | Son |
| 2013/0010473 A1 | 1/2013 | Dellian et al. |
| 2013/0038230 A1* | 2/2013 | Brown ............... H05B 33/0815 315/201 |
| 2013/0039051 A1 | 2/2013 | Wu |
| 2013/0044471 A1 | 2/2013 | Chen |
| 2013/0044476 A1 | 2/2013 | Bretschneider et al. |
| 2013/0050997 A1 | 2/2013 | Bretschneider et al. |
| 2013/0050998 A1 | 2/2013 | Chu et al. |
| 2013/0057146 A1 | 3/2013 | Chao |

(56) References Cited

U.S. PATENT DOCUMENTS

| | | | |
|---|---|---|---|
| 2013/0058079 A1 | 3/2013 | Dellian et al. | |
| 2013/0063944 A1 | 3/2013 | Lodhie et al. | |
| 2013/0077297 A1 | 3/2013 | Wu et al. | |
| 2013/0094200 A1 | 4/2013 | Dellian et al. | |
| 2013/0147381 A1* | 6/2013 | Yang .................. | H05B 33/0818 315/210 |
| 2013/0148349 A1 | 6/2013 | Pasqualini et al. | |
| 2013/0200797 A1 | 8/2013 | Timmermans et al. | |
| 2013/0201690 A1 | 8/2013 | Vissenberg et al. | |
| 2013/0206597 A1 | 8/2013 | Wang et al. | |
| 2013/0221867 A1 | 8/2013 | Deppe et al. | |
| 2013/0230995 A1 | 9/2013 | Ivey et al. | |
| 2013/0242553 A1 | 9/2013 | Feng et al. | |
| 2013/0250610 A1 | 9/2013 | Brick et al. | |
| 2013/0258668 A1 | 10/2013 | Dellian et al. | |
| 2014/0009068 A1 | 1/2014 | Ivey et al. | |
| 2014/0009926 A1 | 1/2014 | Simon et al. | |
| 2014/0015345 A1 | 1/2014 | Ivey et al. | |
| 2014/0036492 A1 | 2/2014 | Simon et al. | |
| 2014/0184082 A1 | 7/2014 | Siemiet et al. | |
| 2014/0268727 A1 | 9/2014 | Amrine, Jr. et al. | |
| 2014/0355262 A1 | 12/2014 | Ivey et al. | |
| 2014/0368342 A1 | 12/2014 | Ivey et al. | |
| 2015/0009690 A1 | 1/2015 | Simon et al. | |
| 2015/0098228 A1 | 4/2015 | Simon et al. | |
| 2015/0204487 A1 | 7/2015 | Scapa et al. | |
| 2015/0334790 A1 | 11/2015 | Scapa et al. | |

FOREIGN PATENT DOCUMENTS

| | | |
|---|---|---|
| CN | 2869556 Y | 2/2007 |
| CN | 101016976 A | 8/2007 |
| CN | 101075605 A | 11/2007 |
| CN | 201129681 Y | 10/2008 |
| CN | 201184574 Y | 1/2009 |
| CN | 101737664 A1 | 6/2010 |
| DE | 19651140 A1 | 6/1997 |
| DE | 19624087 A1 | 12/1997 |
| DE | 29819966 U1 | 3/1999 |
| DE | 29817609 U1 | 1/2000 |
| DE | 20018865 U1 | 2/2001 |
| DE | 102004035027 A1 | 2/2006 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0714556 | 1/1991 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 | 1/1995 |
| EP | 0432848 B1 | 4/1995 |
| EP | 0659531 A1 | 6/1995 |
| EP | 0403001 B1 | 8/1995 |
| EP | 0525876 | 5/1996 |
| EP | 0889283 A1 | 7/1999 |
| EP | 0458408 B1 | 9/1999 |
| EP | 0578302 B1 | 9/1999 |
| EP | 0723701 B1 | 1/2000 |
| EP | 1142452 B1 | 3/2001 |
| EP | 0787419 B1 | 5/2001 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1624728 A1 | 2/2006 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 | 6/2007 |
| EP | 0922305 B1 | 8/2007 |
| EP | 0922306 B1 | 8/2007 |
| EP | 1194918 B1 | 8/2007 |
| EP | 1833035 A1 | 9/2007 |
| EP | 1048085 B1 | 11/2007 |
| EP | 1852648 A1 | 11/2007 |
| EP | 1763650 B1 | 12/2007 |
| EP | 1776722 B1 | 1/2008 |
| EP | 1873012 A1 | 1/2008 |
| EP | 1881261 A1 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1157428 B1 | 9/2008 |
| EP | 1000522 B1 | 12/2008 |
| EP | 1502483 B1 | 12/2008 |
| EP | 1576858 B1 | 12/2008 |
| EP | 1646092 B1 | 1/2009 |
| EP | 1579736 B1 | 2/2009 |
| EP | 1889519 B1 | 3/2009 |
| EP | 1537354 B1 | 4/2009 |
| EP | 1518445 B1 | 5/2009 |
| EP | 1337784 B1 | 6/2009 |
| EP | 2013530 B1 | 8/2009 |
| EP | 1461982 B1 | 9/2009 |
| EP | 2333407 A1 | 6/2011 |
| EP | 2430888 | 3/2012 |
| EP | 2469155 A1 | 6/2012 |
| EP | 2573457 A1 | 3/2013 |
| EP | 2554895 A1 | 6/2013 |
| FR | 2813115 | 2/2002 |
| GB | 2165977 A | 4/1986 |
| GB | 2215024 A | 9/1989 |
| GB | 2324901 A | 11/1998 |
| GB | 2447257 A | 9/2008 |
| GB | 2472345 A | 2/2011 |
| GB | 2486410 A | 6/2012 |
| GB | 2495647 A | 4/2013 |
| JP | S62241382 | 10/1987 |
| JP | 06-054289 | 2/1994 |
| JP | H6-54103 U | 7/1994 |
| JP | 07-249467 | 9/1995 |
| JP | 7264036 | 10/1995 |
| JP | 08-162677 A | 6/1996 |
| JP | H10308536 | 11/1998 |
| JP | 11-135274 A | 5/1999 |
| JP | H11-162234 A | 6/1999 |
| JP | H11-260125 A | 9/1999 |
| JP | 2001-238272 A | 8/2001 |
| JP | 2001-291406 A | 10/2001 |
| JP | 2002-141555 A | 5/2002 |
| JP | 2002289373 A | 10/2002 |
| JP | 3098271 U | 2/2004 |
| JP | 2004-119078 A | 4/2004 |
| JP | 2004-273234 A | 9/2004 |
| JP | 2004-335426 | 11/2004 |
| JP | 2005-158363 A | 6/2005 |

(56) References Cited

FOREIGN PATENT DOCUMENTS

| | | |
|---|---|---|
| JP | 2005-166617 A | 6/2005 |
| JP | 2005-347214 A | 12/2005 |
| JP | 2006012859 A | 1/2006 |
| JP | 2006-507641 A | 3/2006 |
| JP | 2005-322866 A | 12/2006 |
| JP | 2007-227342 A | 9/2007 |
| JP | 3139714 U | 2/2008 |
| JP | 2008-186758 A | 8/2008 |
| JP | 2008-258124 A | 10/2008 |
| JP | 2008-293753 A | 12/2008 |
| JP | 3154200 | 9/2009 |
| JP | 2009283183 A | 12/2009 |
| JP | 201015754 | 1/2010 |
| JP | 4491695 B1 | 6/2010 |
| JP | 2010-192229 A1 | 9/2010 |
| JP | 2010-205553 A | 9/2010 |
| KR | 10-2004-0008244 A | 1/2004 |
| KR | 10-2006-0112113 A | 10/2006 |
| KR | 20-0430022 Y1 | 11/2006 |
| KR | 10-2006-0133784 A | 12/2006 |
| KR | 10-2007-0063595 A | 6/2007 |
| KR | 10-0781652 | 12/2007 |
| KR | 10-0844538 B1 | 7/2008 |
| KR | 10-0888669 B1 | 3/2009 |
| KR | 10-0927851 B1 | 11/2009 |
| TW | M337036 | 7/2008 |
| TW | M349465 U | 1/2009 |
| WO | 99-06759 A1 | 2/1999 |
| WO | 99-10867 A1 | 3/1999 |
| WO | 99-31560 A2 | 6/1999 |
| WO | 99/45312 A1 | 9/1999 |
| WO | 99/57945 A1 | 11/1999 |
| WO | 00/01067 A2 | 1/2000 |
| WO | WO0225842 A2 | 3/2002 |
| WO | 02-61330 | 8/2002 |
| WO | WO02069306 A2 | 9/2002 |
| WO | WO02091805 A2 | 11/2002 |
| WO | WO02098182 A2 | 12/2002 |
| WO | WO02099780 A2 | 12/2002 |
| WO | WO03026358 A1 | 3/2003 |
| WO | WO03055273 A2 | 7/2003 |
| WO | WO03067934 A2 | 8/2003 |
| WO | WO03090890 A1 | 11/2003 |
| WO | WO03096761 A1 | 11/2003 |
| WO | WO2004021747 A2 | 3/2004 |
| WO | WO2004023850 A2 | 3/2004 |
| WO | WO2004032572 A2 | 4/2004 |
| WO | WO2004057924 | 7/2004 |
| WO | WO2004100624 A2 | 11/2004 |
| WO | WO2005031860 A2 | 4/2005 |
| WO | WO2005052751 A2 | 6/2005 |
| WO | WO2005060309 A2 | 6/2005 |
| WO | WO2005084339 A2 | 9/2005 |
| WO | WO2005089293 A2 | 9/2005 |
| WO | WO2005089309 A2 | 9/2005 |
| WO | WO2005103555 A1 | 11/2005 |
| WO | WO2005116519 A1 | 12/2005 |
| WO | WO2006023149 A2 | 3/2006 |
| WO | WO2006044328 A1 | 4/2006 |
| WO | WO2006046207 A1 | 5/2006 |
| WO | WO2006056120 A1 | 6/2006 |
| WO | 2006095315 A1 | 9/2006 |
| WO | WO2006093889 A2 | 9/2006 |
| WO | WO2006095316 A1 | 9/2006 |
| WO | WO2006127666 A2 | 11/2006 |
| WO | WO2006127785 A2 | 11/2006 |
| WO | WO2006133272 A2 | 12/2006 |
| WO | WO2006137686 A1 | 12/2006 |
| WO | WO2007004679 A1 | 1/2007 |
| WO | WO2007081674 A1 | 7/2007 |
| WO | WO2007090292 A1 | 8/2007 |
| WO | WO2007094810 A2 | 8/2007 |
| WO | WO2007143991 A1 | 12/2007 |
| WO | WO2008018002 A2 | 2/2008 |
| WO | WO2008027093 A2 | 3/2008 |
| WO | WO2008061991 A1 | 5/2008 |
| WO | WO2008110978 A1 | 9/2008 |
| WO | WO2008129488 A2 | 10/2008 |
| WO | WO2008137460 A2 | 11/2008 |
| WO | WO2009061124 A2 | 5/2009 |
| WO | WO2009067074 A1 | 5/2009 |
| WO | WO2009111978 A1 | 9/2009 |
| WO | WO2009143047 A2 | 11/2009 |
| WO | WO2010011971 A1 | 1/2010 |
| WO | WO2010014437 A2 | 2/2010 |
| WO | WO2010030509 A2 | 3/2010 |
| WO | WO2010047896 A3 | 4/2010 |
| WO | WO2010047898 A3 | 4/2010 |
| WO | WO2010047973 A3 | 4/2010 |
| WO | WO2010069983 A1 | 6/2010 |
| WO | WO2010083370 A2 | 7/2010 |
| WO | WO2010088105 A3 | 8/2010 |
| WO | WO2010132625 A2 | 11/2010 |
| WO | WO2010141537 A2 | 12/2010 |
| WO | WO2011005562 A2 | 1/2011 |
| WO | WO2011005579 A2 | 1/2011 |
| WO | WO2011021719 A1 | 2/2011 |
| WO | WO2011072308 A1 | 6/2011 |
| WO | WO2011074884 A2 | 6/2011 |
| WO | WO2011113709 A2 | 9/2011 |
| WO | WO2011117059 A1 | 9/2011 |
| WO | WO2011159436 A2 | 12/2011 |
| WO | WO2012001584 A1 | 1/2012 |
| WO | WO2012004708 A2 | 1/2012 |
| WO | WO2012007899 A1 | 1/2012 |
| WO | WO2012019535 A1 | 2/2012 |
| WO | WO2012025626 A1 | 3/2012 |
| WO | WO2012063174 A1 | 5/2012 |
| WO | WO2012117018 A1 | 9/2012 |
| WO | WO2012129301 A1 | 9/2012 |
| WO | WO2012131522 A1 | 10/2012 |
| WO | WO2012131547 A1 | 10/2012 |
| WO | WO2013028965 A2 | 2/2013 |
| WO | WO2013029960 A1 | 3/2013 |
| WO | WO2013030128 A2 | 3/2013 |
| WO | WO2013045255 A1 | 4/2013 |
| WO | WO2013045439 A1 | 4/2013 |
| WO | WO2013057660 A2 | 4/2013 |
| WO | WO2013079242 A1 | 6/2013 |
| WO | WO2013088299 A1 | 6/2013 |
| WO | 2013/097823 A1 | 7/2013 |
| WO | 2013/098700 A1 | 7/2013 |
| WO | WO2013113548 A1 | 8/2013 |
| WO | WO2013113661 A1 | 8/2013 |
| WO | WO2013121347 A1 | 8/2013 |
| WO | WO2013132383 A1 | 9/2013 |
| WO | WO2013135527 A1 | 9/2013 |
| WO | WO2013167419 A1 | 11/2013 |

OTHER PUBLICATIONS

Extended European Search Report for European Application No. 11760309 mailed on Sep. 30, 2013 in 7 pages.
International Search Report and Written Opinion dated Oct. 10, 2013 for the International Application No. PCT/US2013/049427 filed Jul. 5, 2013.
International Search Report and Written Opinion dated Aug. 13, 2013 for the International Application No. PCT/US2013/028669 filed Mar. 1, 2013.
International Search Report and Written Opinion dated Sep. 23, 2013 for the International Application No. PCT/US2013/049432 filed Jul. 5, 2013.
Supplementary European Search Report for corresponding European Application No. 10797603.7 mailed Aug. 5, 2013 in 5 pages.
International Search Report and Written Opinion dated Nov. 16, 2015 from the International Application No. PCT/US2015/0030619.
European Office Action in EP098224249, a related matter, mailed Jan. 13, 2015, 2 pages.
ISR & WO for PCT/US2015011711 dated Mar. 23, 2015.
Office Action in related Japanese matter, dated Feb. 24, 2015.

(56) References Cited

OTHER PUBLICATIONS

PLC-81756-AL "Fireball" Contemporary Pendant Light, [online], [retrieved on Feb. 27, 2009] Retrieved from the Arcadian Lighting Web Page using Internet <URL: http://www.arcadianlighting .com/plc-81756-al.html>.
PLC-96973-PC PLC Lighting Elegance Modern/Contemporary Pendant Light, [online], [retrieved on Feb. 27, 2009] Retrieved from the Arcadian Lighting Web Page using Internet <URL: http/www.arcadianlighting.com/plc-96978-pc.html>.
Saha et al, "Location Determination of a Mobile Device using IEEE 802.11 Access Point Signals", May 5, 2002 in 20 pages.
Sensor Switch, nLight Lighting Control System, [online], [retrieved on Jan. 11, 2008] Retrieved from Sensor Switch web page using Internet <URL: http://www.sensorswitch.com>.
Six Strategies, [online], [retrieved on Jan. 11, 2008] Retrieved from Encelium Technologies Inc. Web Page using Internet <URL: http://www.encelium.com/products/strategies.html>.
Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.
Telecite Products & Services—Display Options, [online], [retrieved on Jan. 13, 2000] Retrieved from Telecite Web page using Internet <URL: http://www.telecite.com/en/products/options en.htm>.
Traffic Signal Products—Transportation Products Group, [online], [retrieved on Jan. 13, 2000] Retrieved from the Dialight Web Page using Internet <URL: http://www.dialight.com/trans.htm>.
Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.
Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.
Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.
Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.
International Search Report and Written Opinion dated Feb. 15, 2013 from the corresponding International Application No. PCT/US2012/052244 filed on Aug. 24, 2012.
International Search Report and Written Opinion dated Aug. 30, 2011 for the corresponding International Application No. PCT/US2011/029994 filed Mar. 25, 2011.
Notification of Transmittal, the International Search Report and the Written Opinion of the International Searching Authority dated May 7, 2012, from the corresponding International Application No. PCT/US2011/064151.
Supplementary European Search Report for corresponding European Application No. 09822381.1 mailed Jan. 4, 2013 in 5 pages.
Supplementary European Search Report dated Feb. 22, 2012 from European Patent Application No. 09822424.9.
International Report on Patentability dated May 24, 2010 from the corresponding International Application No. PCT/US2009/060087 filed Oct. 9, 2009.
Extended European Search Report for co-pending European Application No. 10 73 2124 mailed on Dec. 13, 2012 in 8 pages.
Extended European Search Report for co-pending European Application No. 09822425.6 mailed on Aug. 30, 2012 in 9 pages.
Extended European Search Report for co-pending European Application No. 10797596.3 mailed on Jan. 17, 2013 in 11pages.
Extended European Search Report for co-pending European Application No. 10736237.8 mailed on Oct. 19, 2012 in 5 pages.
Extended European Search Report for co-pending European Application No. 10738925.6 mailed on Oct. 1, 2012 in 7 pages.
Examination and Search Report mailed on Jul. 2, 2012 in cooresponding United Kingdom Application No. 1018896.9 in 4 pages.
International Search Report and Written Opinion dated Jan. 4, 2010 from the corresponding International Application No. PCT/US2009/044313 filed May 18, 2009.
International Search Report and Written Opinion dated Feb. 7, 2011 from the corresponding International Application No. PCT/US2010/039678 filed Jun. 23, 2010.
International Search Report and Written Opinion dated May 7, 2010 from the corresponding International Application No. PCT/US2009/057109 filed on Sep. 16, 2009.
International Search Report and Written Opinion dated Apr. 8, 2010 from the corresponding International Application No. PCT/2009/055114 filed on Aug. 27, 2009.
International Search Report and Written Opinion dated Feb. 8, 2011 from the corresponding International Application No. PCT/US2010/039608 filed Jun. 23, 2010.
International Search Report and Written Opinion dated Dec. 13, 2010 from the corresponding International Application No. PCT/US2010/037006 filed Jun. 2, 2010.
International Search Report and Written Opinion dated Mar. 13, 2012 from the corresponding International Application No. PCT/US2011/052995 filed on Sep. 23, 2011.
International Search Report and Written Opinion dated May 14, 2010 from the corresponding International Application No. PCT/US2009/060085 filed Oct. 9, 2009.
International Search Report and Written Opinion dated Aug. 16, 2010 from the corresponding International Application No. PCT/US2010/021131 filed on Jan. 15, 2010.
International Search Report and Written Opinion dated Jul. 16, 2009 from the corresponding International Application No. PCT/US2008/084650 filed Nov. 25, 2008.
International Search Report and Written Opinion dated Aug. 17, 2010 from the corresponding International Application No. PCT/US2010/021489 filed on Jan. 20, 2010.
International Search Report and Written Opinion dated Jul. 17, 2009 from the corresponding International Application No. PCT/US2008/085118 filed Dec. 1, 2008.
International Search Report and Written Opinion dated Nov. 21, 2011 from the corresponding International Application No. PCT/US2011/029932 filed on Mar. 25, 2011.
International Search Report and Written Opinion dated Mar. 22, 2010 from the corresponding International Application No. PCT/US2009/053853 filed Aug. 14, 2009.
International Search Report and Written Opinion dated Nov. 23, 2011 from the corresponding International Application No. PCT/US2011/042761 filed on Jul. 1, 2011.
International Search Report and Written Opinion dated Nov. 23, 2011 from the corresponding International Application No. PCT/US2011/042775 filed on Jul. 1, 2011.
International Search Report and Written Opinion dated Dec. 24, 2010 from the corresponding International Application No. PCT/US2010/034635 filed May 13, 2010
International Search Report and Written Opinion dated May 24, 2010 from the corresponding International Application No. PCT/2009/060083 filed Oct. 9, 2009.
Notification of Transmittal, the International Search Report and the Written Opinion of the International Searching Authority dated May 7, 2012 from the corresponding International Application No. PCT/US2011/058312
International Search Report and Written Opinion dated Aug. 25, 2009 from corresponding International Application No. PCT/US2009/031049 filed Jan. 15, 2009.
International Search Report and Written Opinion dated Jan. 25, 2010 from the corresponding International Application No. PCT/US2009/048623 filed Jun. 25, 2009.
International Search Report and Written Opinion dated Feb. 26, 2010 from the corresponding International Application No. PCT/US2009/050949 filed Jul. 17, 2009.

(56) References Cited

OTHER PUBLICATIONS

International Search Report and Written Opinion dated Apr. 30, 2010 from the corresponding International Application No. PCT/US2009/057072 filed on Sep. 16, 2009.
International Search Report and Written Opinion dated Jul. 30, 2010 from the corresponding International Application No. PCT/US2010/021448 filed on Jan. 20, 2010.
International Search Report and Written Opinion dated Sep. 30, 2011 from the corresponding International Application No. PCT/US2011/029905 filed on Mar. 25, 2011.
Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module.html?b=offices&m+Central HVAC Systems&s=Contr . . . >.
International Search Report and Written Opinion dated Feb. 9, 2012 from the corresponding International Application No. PCT/US2011/043524 filed on Jul. 11, 2011.
Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.
Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.
D.N.A.-III, [online], [retrieved Mar. 10, 2009] Retrieved from the PLC Lighting Web Page using Internet <URL: http://www.plclighting.com/product_info.php?cPath=1&products_id=92>.
E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.
E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.
E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.
E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.
E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.
Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.
Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.
Hightower et al, "A Survey and Taxonomy of Location Systems for Ubiquitous Computing", University of Washington, Computer Science and Engineering, Technical Report UW-CSE 01-08-03, IEEE, Aug. 24, 2001 in 29 pages.
Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.
LCD Optics 101 Tutorial [online]. 3M Corporation, [retrieved on Jan. 6, 2010]. Retrieved from the internet: <URL: http://solutions.3m.com/wps/portal/3M/en_US/Vikuiti1/BrandProducts/secondary/optics101/>.
LED Lights, Replacement LED lamps for any incandescent light, [online], [retrieved on Jan. 13, 2000] Retrieved from LED Lights Web Page using Internet <URL: http://www.ledlights.com/replac.htm>.
Ledtronics, Ledtronics Catalog, 1996, p. 10, Ledtronics, Torrance, California.
Phason Electronic Control Systems, Light Level Controller (LLC) case study. Nov. 30, 2004. 3 pages, Phason Inc., Winnipeg, Manitoba, Canada.
Philips. Sense and Simplicity—Licensing program for LED Luminaires and Retrofits, Philips Intellectual Property & Standards, May 5, 2009.
Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

\* cited by examiner

USER INPUT SYSTEMS FOR AN LED-BASED LIGHT

CROSS REFERENCE TO RELATED APPLICATIONS

This application claims priority to U.S. Provisional Patent Application No. 61/992,290 filed May 13, 2014, the entire contents of which is incorporated herein by reference.

TECHNICAL FIELD

The embodiments disclosed herein relate to light emitting diode (LED)-based lights for replacing lights in standard light fixtures.

BACKGROUND

Fluorescent and incandescent lights are widely used in a variety of locations, such as schools and office buildings. LED-based lights designed as one-for-one replacements for these and other lights have appeared in recent years.

SUMMARY

Disclosed herein are embodiments of LED-based lights. In one aspect, an LED-based replacement light includes a plurality of LEDs, an LED controller for operating the LEDs, a user input interface in communication with the LED controller, a housing for the LEDs, the LED controller and the user input interface, and a connector disposed at an end of the housing and shaped for connection with a light socket. The LED controller establishes different operating states for the LEDs that include only a limited number of discrete ON states. The user input interface is configured to receive user input, and in response to the user input, activate the LED controller to operate the LEDs according to one of the different operating states.

In another aspect, an LED-based replacement light includes a plurality of LEDs, power supply circuitry for the LEDs, a user input interface in communication with the power supply circuitry, a housing for the LEDs, the LED controller and the user input interface, and a connector disposed at an end of the housing and shaped for connection with a light socket. The power supply circuitry includes an integrated circuit configured to receive analog dimming signals, and in response to the analog dimming signals, generate respective PWM dimming signals. The power supply circuitry is also configured to operate the LEDs in response to the PWM dimming signals according to respective associated operating states for the LEDs. The power supply circuitry further establishes resistances between a reference voltage node and the integrated circuit generating respective analog dimming signals at the integrated circuit. The resistances including only a limited number of discrete resistances corresponding to respective analog dimming signals at the integrated circuit and respective PWM dimming signals associated with a limited number of respective discrete ON states for the LEDs. The user input interface is configured to receive user input, and in response to the user input, selectively activate the discrete resistances.

These and other aspects will be described in additional detail below.

BRIEF DESCRIPTION OF THE DRAWINGS

The various features, advantages and other uses of the present apparatus and systems will become more apparent by referring to the following detailed description and drawings in which.

DETAILED DESCRIPTION

This disclosure relates to LED-based lights configured to operate according to multiple different operating states. The LED-based light is equipped to establish an interface for receiving input, for example from a user or from a control source. The input, for instance, can indicate a desired operation for the LED-based light. In the examples, the LED-based light is responsive to the input to operate its LEDs according to one of the operating states.

Figure 1:
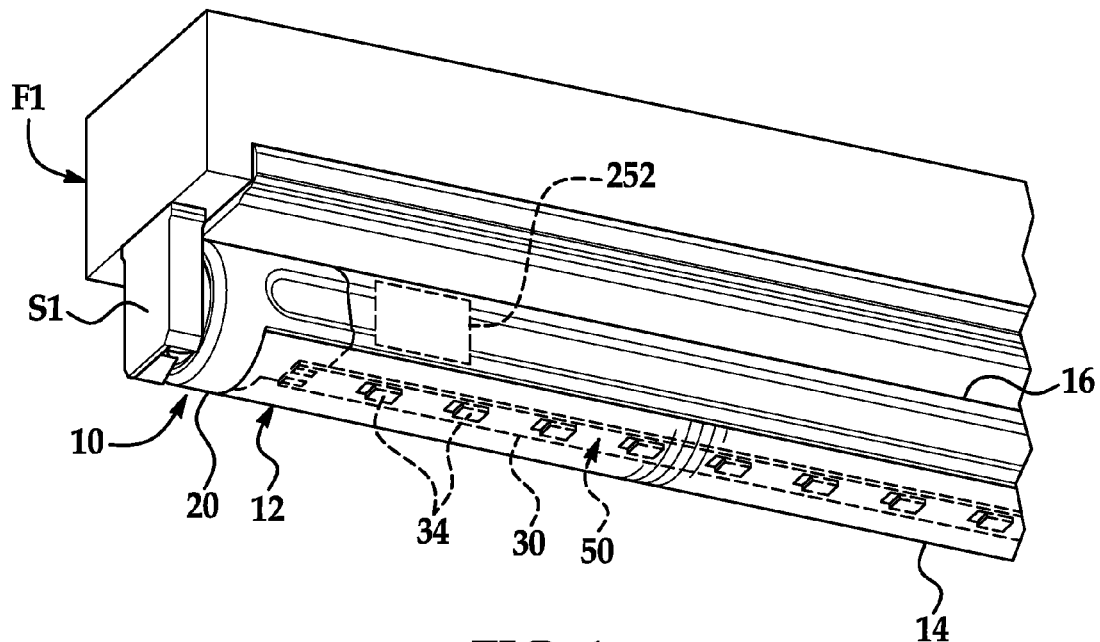
FIG. 1 is a partial perspective view of a first example of an LED-based light installed in a light fixture.
Figure 2:
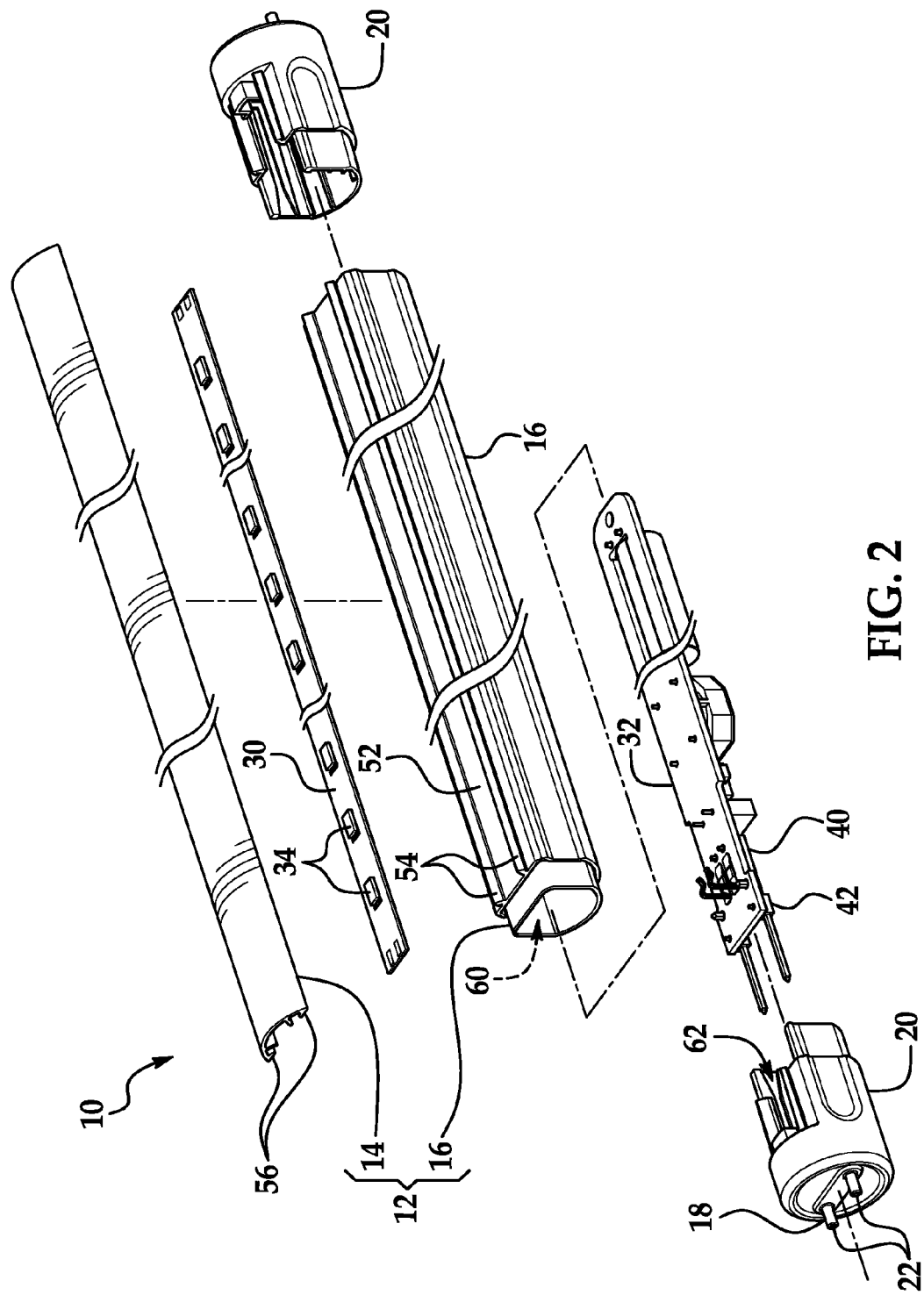
FIG. 2 is a perspective assembly view of the first example of an LED-based light.

A first example of an LED-based light 10 for replacing a conventional light in a standard fluorescent light fixture F is illustrated in FIGS. 1 and 2. As shown in FIGS. 1 and 2 and explained in greater detail below, the LED-based light 10 includes a plurality of light producing LEDs 34. The LED-based light 10 includes a housing 12 and has a pair of end caps 20 positioned at the ends of the housing 12. An LED circuit board 30 including the LEDs 34 and a power supply circuit board 32 are arranged within the housing 12.

The housing 12 of the LED-based light 10 can generally define a single package sized for use in a light fixture F1. In the illustrated example, the pair of end caps 20 is attached at opposing longitudinal ends of the housing 12 for physically connecting the LED-based light 10 to the light fixture F1. As shown, each end cap 20 carries an electrical connector 18 configured to physically connect to the light fixture F1. The electrical connectors 18 can be the sole physical connection between the LED-based light 10 and the light fixture F1. The illustrated example of the light fixture F1 for the LED-based light 10 is a troffer designed to accept conventional fluorescent lights, such as T5, T8 or T12 fluorescent tube lights. These and other light fixtures F1 for the LED-based light 10 can include one or more sockets S1 adapted for physical engagement with the electrical connectors 18. Each of the illustrated electrical connectors 18 is a bi-pin connector including two pins 22. Bi-pin electrical connectors 18 are compatible with many fluorescent light fixtures and sockets, although other types of electrical connectors can be used, such as a single pin connector.

The light fixture F1 can connect to a power source, and at least one of the electrical connectors 18 can additionally electrically connect the LED-based light 10 to the light fixture F1 to provide power to the LED-based light 10. In this example, each electrical connector 18 can include two pins 22, although two of the total four pins can be "dummy pins" that provide physical but not electrical connection to the light fixture F1. The light fixture F1 can optionally include a ballast for electrically connecting between the power source and the LED-based light 10.

While the illustrated housing 12 is cylindrical, a housing having a square, triangular, polygonal, or other cross sectional shape can alternatively be used. Similarly, while the illustrated housing 12 is linear, housings having an alternative shape, e.g., a U-shape or a circular shape can alternatively be used. The LED-based light 10 can have any suitable length. For example, the LED-based light 10 may be approximately 48" long, and the housing 12 can have a 0.625", 1.0" or 1.5" diameter for engagement with a standard fluorescent light fixture.

The housing 12 can be formed by attaching multiple individual parts, not all of which need be light transmitting. For example, illustrated example of the housing 12 is formed in part by attaching a lens 14 at least partially defining the housing 12 to an opaque lower portion 16. The illustrated housing 12 has a generally bipartite configuration defining a first cavity 50 between the lower portion 16 and the lens 14 sized and shaped for housing the LED circuit board 30 and a second cavity 60 defined by the lower portion 16 sized and shaped for housing the power supply circuit board 32.

As shown, the lower portion 16 defines an LED mounting surface 52 for supporting the LED circuit board 30. The LED mounting surface 52 can be substantially flat, so as to support a flat underside of the LED circuit board 30 opposite the LEDs 34. After attachment of the lens 14 to the lower portion 16 during assembly of the LED-based light 10, the LED circuit board 30 is positioned within the first cavity 50 and adjacent the lens 14, such that the LEDs 34 of the LED circuit board 30 are oriented to illuminate the lens 14.

The illustrated lower portion 16 has a tubular construction to define the second cavity 60, although the lower portion 16 could be otherwise configured to define a cavity configured for housing the power supply circuit board 32. The LED-based light 10 can include features for supporting the power supply circuit board 32 within the second cavity 60. For example, as shown, an end cap 20 may include channels 62 configured to slidably receive outboard portions of an end 32a of the power supply circuit board 32. It will be understood that the channels 62 are provided as a non-limiting example and that the power supply circuit board 32 may be otherwise and/or additionally supported within the second cavity 60.

The lower portion 16 may be constructed from a thermally conductive material and configured as a heat sink to enhance dissipation of heat generated by the LEDs 34 during operation to an ambient environment surrounding the LED-based light 10. In the exemplary LED-based light 10, an LED mounting surface 52 of the lower portion 16 is thermally coupled to the LEDs 34 through the LED circuit board 30, and the remainder of the lower portion 16 defines a heat transfer path from the LED mounting surface 52 to the ambient environment.

The lower portion 16 and the lens 14 may each include complementary structures permitting for attachment of the lens 14 to the lower portion 16 to define the first cavity 50. For example, as shown, the lower portion 16 may include a pair of hooked projections 54 for retaining a corresponding pair of projections 56 of the lens 14. The projections 56 of the lens 14 can be slidably engaged with the hooked projections 54 of the lower portion 16, or can be snap fit to the hooked projections 54. The hooked projections 54 can be formed integrally with the lower portion 16 by, for example, extruding the lower portion 16 to include the hooked projections 54. Similarly, the projections 56 can be formed integrally with the lens 14 by, for example, extruding the lens 14 to include the projections 56. The hooked projections 54 and projections 56 can extend the longitudinal lengths of the lower portion 16 and the lens 14, respectively, although a number of discrete hooked projections 54 and/or projections 56 could be used to couple the lens 14 to the lower portion 16. Alternatively, the lower portion 16 could be otherwise configured for attachment with the lens 14. For example, the lens 14 could be clipped, adhered, snap- or friction-fit, screwed or otherwise attached to the lower portion 16.

Alternatively to the illustrated housing 12, the housing 12 can include a light transmitting tube at least partially defined by the lens 14. The lens 14 can be made from polycarbonate, acrylic, glass or other light transmitting material (i.e., the lens 14 can be transparent or translucent). The term "lens" as used herein means a light transmitting structure, and not necessarily a structure for concentrating or diverging light.

The LED-based light 10 can include features for distributing the light produced by the LEDs 34 to, for example, emulate in full or in part the uniform light distribution of a conventional fluorescent light. For instance, the lens 14 can be manufactured to include light diffusing structures, such as ridges, dots, bumps, dimples or other uneven surfaces formed on an interior or exterior of the lens 14. The light diffusing structures can be formed integrally with the lens 14, for example, by molding or extruding, or the structures can be formed in a separate manufacturing step such as surface roughening. Alternatively, the material from which the lens 14 is formed can include light refracting particles. For example, the lens 14 can be made from a composite, such as polycarbonate, with particles of a light refracting material interspersed in the polycarbonate. In addition to or as an alternative to these light diffusing structures, a light diffusing film can be applied to the exterior of the lens 14 or placed in the housing 12.

The LED-based light 10 can include other features for distributing light produced by the LEDs 34. For example, the lens 14 can be manufactured with structures to collimate light produced by the LEDs 34. The light collimating structures can be formed integrally with the lens 14, for example, or can be formed in a separate manufacturing step. In addition to or as an alternative to manufacturing the lens 14 to include light collimating structures, a light collimating film can be applied to the exterior of the lens 14 or placed in the housing 12.

In yet other embodiments, the LEDs 34 can be over molded or otherwise encapsulated with light transmitting material configured to distribute light produced by the LEDs 34. For example, the light transmitting material can be configured to diffuse, refract, collimate and/or otherwise distribute the light produced by the LEDs 34. The over molded LEDs 34 can be used alone to achieve a desired light distribution for the LED-based light 10, or can be implemented in combination with the lens 14 and/or films described above.

The above described or other light distributing features can be implemented uniformly or non-uniformly along a length and/or circumference of the LED-based light 10. These features are provided as non-limiting examples, and in other embodiments, the LED-based light 10 may not include any light distributing features.

The LED circuit board 30 can include at least one LED 34, a plurality of series-connected or parallel-connected LEDs 34, an array of LEDs 34 or any other arrangement of LEDs 34. Each of the illustrated LEDs 34 can include a single diode or multiple diodes, such as a package of diodes producing light that appears to an ordinary observer as coming from a single source. The LEDs 34 can be surface-mount devices of a type available from Nichia, although other types of LEDs can alternatively be used. For example, the LED-based light 10 can include high-brightness semiconductor LEDs, organic light emitting diodes (OLEDs), semiconductor dies that produce light in response to current, light emitting polymers, electro-luminescent strips (EL) or the like. The LEDs 34 can emit white light. However, LEDs that emit blue light, ultra-violet light or other wavelengths of light can be used in place of or in combination with white light emitting LEDs 34.

The orientation, number and spacing of the LEDs 34 can be a function of a length of the LED-based light 10, a desired lumen output of the LED-based light 10, the wattage of the LEDs 34, a desired light distribution for the LED-based light 10 and/or the viewing angle of the LEDs 34.

The LEDs 34 can be fixedly or variably oriented in the LED-based light 10 for facing or partially facing an environment to be illuminated when the LED-based light 10 is installed in a light fixture. Alternatively, the LEDs 34 can be oriented to partially or fully face away from the environment to be illuminated. In this alternative example, the LED-based light 10 and/or a light fixture for the LED-based light 10 may include features for reflecting or otherwise redirecting the light produced by the LEDs into the environment to be illuminated.

For a 48" LED-based light 10, the number of LEDs 34 may vary from about thirty to three hundred such that the LED-based light 10 outputs between 1,500 and 3,000 lumens. However, a different number of LEDs 34 can alternatively be used, and the LED-based light 10 can output any other amount of lumens.

The LEDs 34 can be arranged in a single longitudinally extending row along a central portion of the LED circuit board 30 as shown, or can be arranged in a plurality of rows or arranged in groups. The LEDs 34 can be spaced along the LED circuit board 30 and arranged on the LED circuit board 30 to substantially fill a space along a length of the lens 14 between end caps 20 positioned at opposing longitudinal ends of the housing 12. The spacing of the LEDs 34 can be determined based on, for example, the light distribution of each LED 34 and the number of LEDs 34. The spacing of the LEDs 34 can be chosen so that light output by the LEDs 34 is uniform or non-uniform along a length of the lens 14. In one implementation, one or more additional LEDs 34 can be located at one or both ends of the LED-based light 10 so that an intensity of light output at the lens 14 is relatively greater at the one or more ends of the LED-based light 10. Alternatively, or in addition to spacing the LEDs 34 as described above, the LEDs 34 nearer one or both ends of the LED-based light 10 can be configured to output relatively more light than the other LEDs 34. For instance, LEDs 34 nearer one or both ends of the LED-based light 10 can have a higher light output capacity and/or can be provided with more power during operation.

The power supply circuit board 32 is positioned within the housing 12 adjacent the electrical connector 18 and has power supply circuitry configured to condition an input power received from, for example, the light fixture F1 through the electrical connector 18, to a power usable by and suitable for the LEDs 34. In some implementations, the power supply circuit board 32 can include one or more of an inrush protection circuit, a surge suppressor circuit, a noise filter circuit, a rectifier circuit, a main filter circuit, a current regulator circuit and a shunt voltage regulator circuit. The power supply circuit board 32 can be suitably designed to receive a wide range of currents and/or voltages from a power source and convert them to a power usable by the LEDs 34.

The LED-based light 10 may require a number of electrical connections to convey power between the various illustrated spatially distributed electrical assemblies included in the LED-based light 10, such as the LED circuit board 30, the power supply circuit board 32 and the electrical connector 18. These connections can be made using a circuit connector header 40 and a pin connector header 42, as shown in FIG. 2. In particular, when the LED-based light 10 is assembled, the circuit connector header 40 may be arranged to electrically couple the LED circuit board 30 to the power supply circuit board 32, and the pin connector header 42 may be arranged to electrically couple the power supply circuit board 32 to the pins 22 of an end cap 20.

As shown, the LED circuit board 30 and the power supply circuit board 32 are vertically opposed and spaced with respect to one another within the housing 12. The LED circuit board 30 and the power supply circuit board 32 can extend a length or a partial length of the housing 12, and the LED circuit board 30 can have a length different from a length of the power supply circuit board 32. For example, the LED circuit board 30 can generally extend a substantial length of the housing 12, and the power supply circuit board 32 can extend a partial length of the housing. However, it will be understood that the LED circuit board 30 and/or the power supply circuit board 32 could be alternatively arranged within the housing 12, and that the LED circuit board 30 and the power supply circuit board 32 could be alternatively spaced and/or sized with respect to one another.

The LED circuit board 30 and the power supply circuit board 32 are illustrated as elongate printed circuit boards. Multiple circuit board sections can be joined by bridge connectors to create the LED circuit board 30 and/or power supply circuit board 32. Also, other types of circuit boards may be used, such as a metal core circuit board. Further, the components of the LED circuit board 30 and the power supply circuit board 32 could be in a single circuit board or more than two circuit boards.

Figure 3:
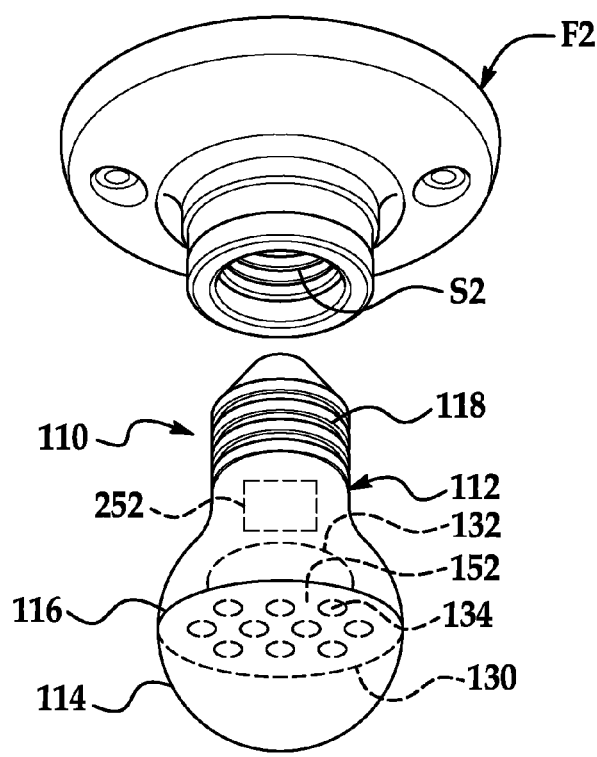
FIG. 3 is a perspective view of a second example of an LED-based light installed in a light fixture.

A second example of an LED-based light 110 for replacing a conventional light in a standard incandescent light fixture F2 is illustrated in FIG. 3. The application and overall function of the LED-based light 110 are similar to the LED-based light 10. Components in the LED-based light 110 with like function and/or configuration as components in the LED-based light 10 are designated similarly, with 100-series designations instead of the 0-series designations for the LED-based light 10, and for brevity, the full descriptions of these components is not repeated.

As shown in FIG. 3, the LED-based light 110 includes a plurality of light producing LEDs 134. The LED-based light 110 includes a housing 112, and an LED circuit board 130 including the LEDs 134 and a power supply circuit board 132 are arranged within the housing 112.

The housing 112 of the LED-based light 110 can generally define a single package sized for use in a light fixture F2. In the illustrated example, an electrical connector 118 is disposed at one end of the housing 12 for physically connecting the LED-based light 110 to the light fixture F2. The electrical connector 118 can be the sole physical connection between the LED-based light 110 and the light fixture F2. The illustrated example of the light fixture F2 includes a socket S2 adapted for physical engagement with the electrical connectors 118. The illustrated electrical connector 118 is a screw type connector compatible with many incandescent light fixtures and sockets, although another type of electrical connector could be used. The light fixture F2 can connect to a power source, and the electrical connector 118 can additionally electrically connect the LED-based light 110 to the light fixture F2 to provide power to the LED-based light 110.

The housing 112 can be formed by attaching multiple individual parts, not all of which need be light transmitting.

For example, illustrated example of the housing 112 is formed in part by attaching a lens 114 at least partially defining the housing 112 to an opaque lower portion 116. The illustrated housing 112 is sized and shaped for housing the LED circuit board 130 and a power supply circuit board 132.

As shown, the lower portion 116 defines an LED mounting surface 152 for supporting the LED circuit board 130. The LED mounting surface 152 can be substantially flat, so as to support a flat underside of the LED circuit board 130 opposite the LEDs 134. After attachment of the lens 114 to the lower portion 116 during assembly of the LED-based light 110, the LED circuit board 130 is positioned within the first cavity 150 and adjacent the lens 114, such that the LEDs 134 of the LED circuit board 130 are oriented to illuminate the lens 114.

The lower portion 116 may be constructed from a thermally conductive material and configured as a heat sink to enhance dissipation of heat generated by the LEDs 134 during operation to an ambient environment surrounding the LED-based light 110. In the exemplary LED-based light 110, an LED mounting surface 152 of the lower portion 116 is thermally coupled to the LEDs 134 through the LED circuit board 130, and the remainder of the lower portion 116 defines a heat transfer path from the LED mounting surface 152 to the ambient environment.

In the second example of the LED-based light 110, the lens 114 or the LEDs 134, or both, can incorporate features the same or similar to those described above for the first example of the LED-based light 110 for distributing the light produced by the LEDs 134 to, for example, emulate in full or in part the uniform light distribution of a conventional incandescent light.

The LED circuit board 130 can include any arrangement of LEDs 134. The orientation, number and spacing of the LEDs 134 can be a function of the size or shape of the LED-based light 110, a desired lumen output of the LED-based light 110, the wattage of the LEDs 134, a desired light distribution for the LED-based light 110 and/or the viewing angle of the LEDs 134.

The power supply circuit board 132 in the second example of the LED-based light 110 is positioned within the housing 112 adjacent the electrical connector 118 and has power supply circuitry configured to condition an input power received from, for example, the light fixture F2 through the electrical connector 118, to a power usable by and suitable for the LEDs 134. In some implementations, the power supply circuit board 132 can include one or more of an inrush protection circuit, a surge suppressor circuit, a noise filter circuit, a rectifier circuit, a main filter circuit, a current regulator circuit and a shunt voltage regulator circuit. The power supply circuit board 132 can be suitably designed to receive a wide range of currents and/or voltages from a power source and convert them to a power usable by the LEDs 134.

Either or both of the first example LED-based light 10 and the second example LED-based light 110 can be configured for the selective control over the operation of their respective LEDs 34 and 134 in response to input, for example from a user or from a control source. The following description of example implementations of such configurations is equally applicable to either the first example LED-based light 10 or the second example LED-based light 110. Accordingly, to avoid duplicative description of these example implementations, the first example LED-based light 10 and the second example LED-based light 110 are collectively referred to below as the LED-based lights 10, 110, and their respective components are similarly referred to collectively.

Figure 4:
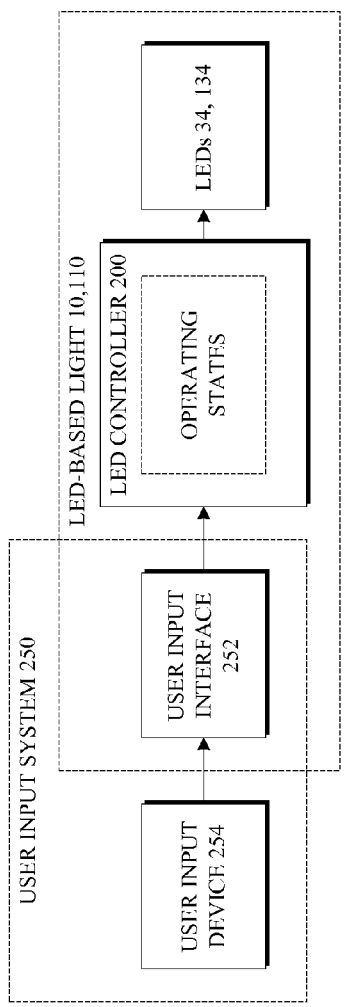
FIG. 4 is a schematic block diagram showing an example user input system for controlling the operation of the example LED-based lights.

In one implementation, one or more controllers may be provided in communication with the LEDs 34, 134 for controlling the operation of the LEDs 34, 134 in response to input. As shown in FIG. 4, for instance, either or both of the LED-based lights 10, 110 may include an LED controller 200 for operating the LEDs 34, 134. The LED controller 200, as shown, can be included onboard the LED-based lights 10, 110, for instance on the power supply circuit boards 32, 132 or on the LED circuit boards 30, 130, although the LED controller 200 could be used apart from the LED-based lights 10, 110, for example as a component of a room or building automation system. It will be understood that the functionality of the LED controller 200 described below can be implemented in whole or in part with a programmable controller, an integrated circuit, circuitry or any other hardware components, either alone or in any combination.

The LED controller 200 is generally configured to generate signals to selectively operate the LEDs 34, 134. These signals, for instance, may drive the LEDs 34, 134 to not emit light according to an OFF state. It will be understood that driving the LEDs 34, 134 to not emit light could alternatively or additionally be achieved separately from the controller 100 by cutting power to the LED-based lights 10, 110 or in the LED-based lights 10, 110 upstream of the LEDs 34, 134. The signals of the controller 200 may, for instance, also drive one, some or all of the LEDs 34, 134 to emit light according to an ON state. The LEDs 34, 134 may be driven in an ON state to emit light at a full operational intensity, for example. The full operational intensity of light can correspond to the absolute light output capacity for the LEDs 34, 134, for instance, or to the light output capacity for the LEDs 34, 134 under nominal operating conditions. Additionally, in ON states, the LEDs 34, 134 may be driven to emit light at intermediate intensities. The LEDs 34, 134 according to these examples may also, for example, be intermittently driven between the OFF state and an ON state.

In the LED-based lights 10, 110, the LEDs 34, 134 are subject to operation according to multiple different set points, or operating states. In connection with this operation of the LEDs 34, 134, the LED-based lights 10, 110 are correspondingly configured to operate according to the multiple different operating states of the LEDs 34, 134. The different operating states for the LEDs 34, 134 can, for example, be established by the configuration of the LED controller 200, as generally indicated in FIG. 4. That is, the LED controller 200 can be configured to generate signals to selectively operate the LEDs 34, 134 according to the different operating states. Where the LED controller 200 is implemented by an integrated circuit, for instance, the different operating states can for example be established in connection with the circuitry of the integrated circuit, either alone or in combination with circuitry or other hardware components connected with the integrated circuit. Where the LED controller 200 is implemented in whole or in part by a programmable controller, for instance, the different operating states can for example be established in whole or in part in connection with the programming of the LED controller 200.

In some examples, the LED-based lights 10, 110 can be configured so that the LEDs 34, 134 all operate in the same manner at any given time, for instance, in response to a common signal from the LED controller 200. In these examples, the LED controller 200 can generate multiple different signals corresponding to respective operating states for the LEDs 34, 134. In other examples, the LED-based lights 10, 110 can be configured so that individual LEDs 34, 134 or groups of LEDs 34, 134 are operated independently from one another. In these examples, the operation of the individual LEDs 34, 134 or groups of LEDs 34, 134 can be coordinated, for example by the LED controller 200, to achieve different operating states for the LEDs 34, 134.

The multiple different operating states established by the LED controller 200 for the LEDs 34, 134 can include those in which the LEDs 34, 134 are driven to emit light in an ON state, and optionally, one in which the LEDs 34, 134 are driven not to emit light in the OFF state. The differences between the ON states for the LEDs 34, 134, and correspondingly for the LED-based lights 10, 110, can be defined with respect to one or more characteristics of the light emanating from the LED-based lights 10, 110 upon operation of the LEDs 34, 134. These differences can be defined, for example, with respect to the intensity of the light emanating from the LED-based lights 10, 110 upon operation of the LEDs 34, 134. In this example, it will be understood that the differences between the ON states for the LEDs 34, 134 can similarly be defined with respect to an amount of power consumed by the LED-based lights 10, 110, for example, the power consumed by the LEDs 34, 134 or by the LED-based lights 10, 110 as a whole upon operation of the LEDs 34, 134. In addition, or alternatively, the differences between the ON states for the LEDs 34, 134 can be defined, for example, with respect to the spatial, spectral, color, color temperature and/or temporal aspects of the light emanating from the LED-based lights 10, 110 upon operation of the LEDs 34, 134.

The LED-based lights 10, 110 can receive input for directing their operation from a control source, for example. Alternatively, or additionally, the LED-based lights 10, 110 can be equipped to establish one or more interfaces between the LED-based lights 10, 110 and a user of the LED-based lights 10, 110. As shown for instance with additional reference to FIG. 4, a user input system 250 for the LED-based lights 10, 110 includes a user input interface 252 in communication with the LED-based lights 10, 110. The user input interface 252 can, as indicated, be included onboard the LED-based lights 10, 110. The user input interface 252 can receive input from a user directly, for example, or through an optional user input device 254.

In the LED-based lights 10, 110, the input from a user can be used, among other things, to direct operation of the LEDs 34, 134 according to the different operating states. For instance, in the example implementations of the LED-based lights 10, 110 including the LED controller 200, the user input interface 252 can be configured, in response to the receipt of input from a user, to activate the LED controller 200 to operate the LEDs 34, 134 according to the different operating states. The user input interface 252 may be configured to support the direct or indirect communication of input received from a user to the LED controller 200. This communication of input received from a user to the LED controller 200 may be effected through the communication of signals from the user input interface 252 to the LED controller 200, either alone, for example, or in connection with the manual actuation of hardware components.

In some implementations of the LED-based lights 10, 110, the different ON states for the LEDs 34, 134 established by the LED controller 200 may be, or include, a continuum of ON states for a given characteristic of the light emanating from the LED-based lights 10, 110 upon operation of the LEDs 34, 134.

In other example implementations, the LED controller 200 may be configured to establish a number of discrete ON states for the LEDs 34, 134, either in total or for a given characteristic of the light emanating from the LED-based lights 10, 110 upon operation of the LEDs 34, 134. The number of discrete ON states in these implementations can optionally be large and approach a continuum of ON states, for instance. Alternatively, the number of discrete ON states in these implementations can be generally limited to a small number of ON states. In this example, the number of discrete ON states could be generally limited, for instance, to between two and ten or less ON states.

In a non-limiting example of the LED-based lights 10, 110 where the differences between different ON states for the LEDs 34, 134 are defined with respect to the intensity of the light emanating from the LED-based lights 10, 110 upon operation of the LEDs 34, 134, the operating states for the LEDs 34, 134, and correspondingly for the LED-based lights 10, 110, could include the OFF state and one or more ON states. In this example, the LEDs 34, 134 can be driven not to emit light in the OFF state. In each of the ON states, one, some or all of the LEDs 34, 134 can be driven to emit light such that light emanates from the LED-based lights 10, 110 with a respective intensity. The ON states can be, or include, a high intensity ON state, where each of the LEDs 34, 134 are driven to emit light at a full operational intensity, and one or more intermediate intensity ON states, such as a medium intensity ON state and a low intensity ON state, for instance.

In a similar non-limiting example, the differences between the ON states for the LEDs 34, 134 can be defined with respect to an amount of power consumed by the LED-based lights 10, 110 upon operation of the LEDs 34, 134. In this example, the operating states for the LEDs 34, 134, and correspondingly for the LED-based lights 10, 110, could include the OFF state and one or more ON states, with the LEDs 34, 134 being driven not to emit light in the OFF state, and with one, some or all of the LEDs 34, 134 being driven to emit light in each of the ON states. In each of the ON states, the LEDs 34, 134 can be driven to collectively consume respective amounts of power. The ON states can be, or include, a high power ON state, where each of the LEDs 34, 134 are driven to emit light at a full operational intensity, and one or more intermediate power ON states, such as a medium power ON state and a low power ON state, for instance.

Figure 5:
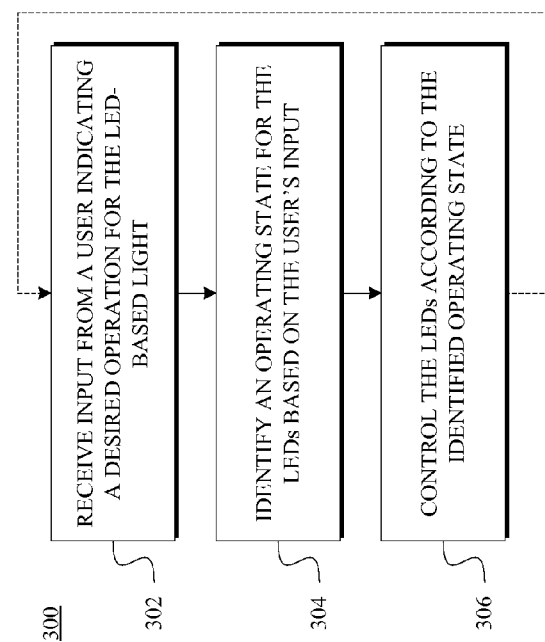
FIG. 5 is a flow diagram depicting operations for controlling the operation of the LED-based lights based on a user's input.

The operations of an example process 300 for effecting the operation of the LED-based lights 10, 110 in response to input are shown in FIG. 5. The process 300 is generally described according to the examples of the LED-based lights 10, 110 with a user input system 250 including a user input interface 252 in communication with the LED-based lights 10, 110. However, the principles of the process 300 are also generally applicable to input from a control source, for instance.

In the example process 300, the LEDs 34, 134 of the LED-based lights 10, 110 are subject to operation according to operating states that may include, for instance, a limited number of discrete ON states, either in total or for a given characteristic of the light emanating from the LED-based lights 10, 110 upon operation of the LEDs 34, 134, and optionally, the OFF state. The different ON states for the LEDs 34, 134 can be defined by the manufacturer of the LED-based lights 10, 110, by a designer of a room or building automation system in which the LED-based lights 10, 110 are utilized, or by a facility manager, for example. It will be understood that the configuration of the LED-based lights 10, 110 where the operating states for the LEDs 34, 134 include a limited number of discrete ON states can provide for a degree of control over the discretion of a user in effecting the operation of the LED-based lights 10, 110. This configuration can be useful, for instance, to support greater control over the management of the power consumed by the LED-based lights 10, 110 and/or of the lighting outcomes in an area including the LED-based lights 10, 110.

In operation 302, the LED-based lights 10, 110 receive input from a user indicating a desired operation for the LED-based lights 10, 110. In operation 304, the LED-based lights 10, 110 may identify an operating state for the LEDs 34, 134, and correspondingly for LED-based lights 10, 110, based on the input from the user.

The process 300 according to operations 302 and 304 may accommodate input specifically indicating a desired operation for the LED-based lights 10, 110 within the context of effecting the operation of the LED-based lights 10, 110 according to a limited number of discrete ON states for the LEDs 34, 134, for example, as well as input more generally indicating a desired operation for the LED-based lights 10, 110.

For instance, according to the examples described above, the LEDs 34, 134 of the LED-based lights 10, 110 can be subject to operation according to operating states including a limited number of discrete ON states, and optionally, the OFF state. If the input from the user generally indicates a desired dimming operation for the LED-based lights 10, 110, for example instead of one of the operating states for the LEDs 34, 134, operation 304 may involve correlating the desired dimming operation for the LED-based lights 10, 110 to one of the available defined operating states. However, in cases of input from the user specifically indicating a desired operation for the LED-based lights 10, 110 in operation 302 within the context of effecting the operation of the LED-based lights 10, 110 according to the operating states for the LEDs 34, 134, it will be understood that the correlation between the desired operation for the LED-based lights 10, 110 and one of the available defined operating states may be generally inherent in the performance of operation 302.

With one of the operating states for the LEDs 34, 134 identified based on the input from the user, in operation 306, the LEDs 34, 134 are controlled to achieve the identified operating state. It will be understood that in some cases of input from the user specifically indicating a desired operation for the LED-based lights 10, 110 in operation 302 within the context of effecting the operation of the LED-based lights 10, 110 according to the operating states for the LEDs 34, 134, the control of the LEDs 34, 134 to achieve the identified operating state in operation 306 may be generally inherent in the performance of operation 302.

As generally indicated in FIG. 5, the process 300 may repeat itself to support the receipt of multiple acts of input from the user. For example, an initial act of input can affect the operation of the LED-based lights 10, 110 according to a first operating state for the LEDs 34, 134, with subsequent acts of input effecting the operation of the LED-based lights 10, 110 according to additional available operating states for the LEDs 34, 134. In an implementation according to the examples described above where the LEDs 34, 134 of the LED-based lights 10, 110 are subject to operation according to operating states including a limited number of discrete ON states, and optionally, the OFF state, for instance, each act of input can generally advance the operation of the LEDs 34, 134 in a looped manner through the OFF state and multiple successive ON states (e.g., a low intensity ON state, a medium intensity ON state and a high intensity ON state, or, similarly, a low power ON state, a medium power ON state and a high power ON state).

FIGS. 6-12 depict specific non-limiting example implementations of the user input system 250 for the LED-based lights 10, 110 according to the foregoing general description. It will be understood that these examples are suitable for utilization both with examples of the LED-based lights 10, 110 where a continuum of ON states for the LEDs 34, 134 is established or with examples of the LED-based lights 10, 110 where discrete ON states for the LEDs 34, 134 are established, including examples where a limited number of discrete ON states for the LEDs 34, 134 are established, as generally described above. Although the example implementations of the user input system 250 are illustrated only according to the first example of the LED-based light 10 to avoid duplicative illustration, it will be understood that the same or similar implementations can also be achieved with the second example of the LED-based light 110. Accordingly, the following description continues with collective reference the LED-based lights 10, 110, and their respective components.

Figure 6:
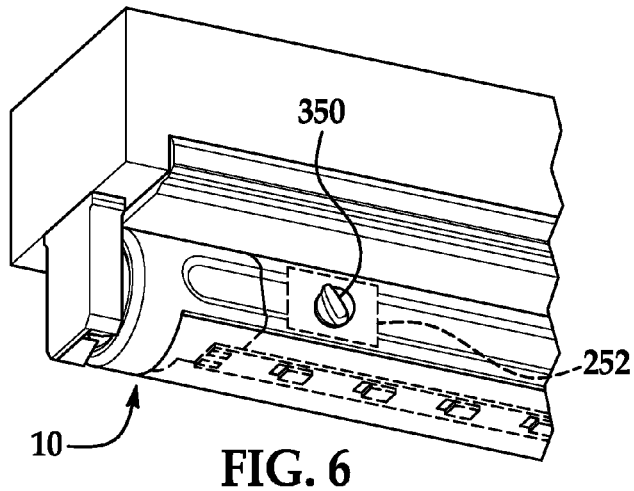
FIGS. 6-12 show example implementations of the user input system.
Figure 7:
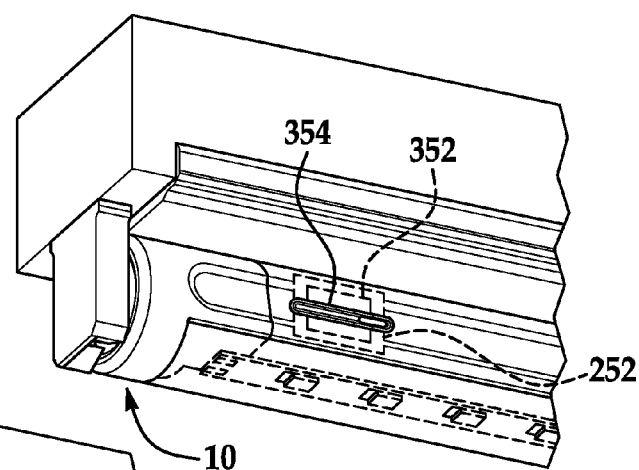
Figure 8:
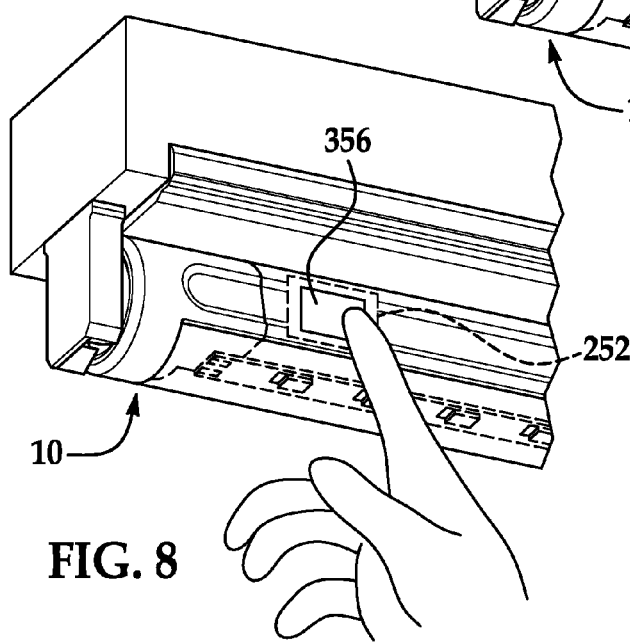

According to the examples of FIGS. 6-8, the user input interface 252 is included onboard the LED-based lights 10, 110 and configured to directly receive input from a user.

In the example of FIG. 6, the user input interface 252 is implemented by an external switch 350 that a user can manipulate to communicate input indicating a desired operation for the LED-based lights 10, 110. The switch 350 can be a multiple position switch as generally shown, with different positions of the switch 350 corresponding, for instance, to a limited number of discrete ON states established for the LEDs 34, 134. Additionally, if the OFF state is established for the LEDs 34, 134, a position of the switch 350 may correspond to the OFF state. In this case, the LED-based lights 10, 110 can be responsive to manipulations of the switch 350 to different positions to operate the LEDs 34, 134 to respective discrete ON states established for the LEDs 34, 134, and, if established, the OFF state for the LEDs 34, 134. Alternatively, the switch 350 could be a single position switch, in which case the LED-based lights 10, 110 could, for instance, be responsive to manipulations of the switch 350 to advance the operation of the LEDs 34, 134 in a looped manner through a limited number of discrete ON states established for the LEDs 34, 134, and, if established, the OFF state for the LEDs 34, 134.

In the example of FIG. 7, the user input interface 252 is implemented by an external switch 352 and a magnetic reed switch 354 internal to the LED-based light 10, 110. The switch 352 includes a magnet and is mounted within a base for slidable movement along a portion of the LED-based lights 10, 110 to multiple positions as generally shown. In this example, the user can manipulate the switch 352 to communicate input indicating a desired operation for the LED-based lights 10, 110. Specifically, the user can manipulate the position of the switch 352 to actuate the magnetic reed switch 354 to associated different positions corresponding, for instance, to a limited number of discrete ON states established for the LEDs 34, 134. Additionally, if the OFF state is established for the LEDs 34, 134, a position of the switch 352 may actuate the magnetic reed switch 354 to an associated position corresponding to the OFF state. In this case, the LED-based lights 10, 110 can be responsive to manipulations of the switch 352 to different positions and associated actuations of the magnetic reed switch 354 to different positions to operate the LEDs 34, 134 to respective discrete ON states established for the LEDs 34, 134, and, if established, the OFF state for the LEDs 34, 134. Alternatively, the switch 352 could be a single position switch, in which case the LED-based lights 10, 110 could, for instance, be responsive to manipulations of the switch 352 and associated actuations of the magnetic reed switch 354 to advance the operation of the LEDs 34, 134 in a looped manner through a limited number of discrete ON states established for the LEDs 34, 134, and, if established, the OFF state for the LEDs 34, 134.

In the example of FIG. 8, the user input interface 252 is implemented by an external switch 356 that a user can manipulate to communicate input indicating a desired operation for the LED-based lights 10, 110. In this example, the switch 356 can be a touch switch or other type of tactile sensor responsive to the touch of a user. The responses of the switch 356 can correspond, for instance, to a limited number of discrete ON states established for the LEDs 34, 134. Additionally, if the OFF state is established for the LEDs 34, 134, a response of the switch 356 may correspond to the OFF state. The switch 356 could be responsive to different types of touches from a user (e.g., touches in different positions or different predetermined patterns or sequences of touches), with different types of touches from a user, and associated different responses of the switch 356, corresponding, for instance, to a limited number of discrete ON states established for the LEDs 34, 134. Additionally, if the OFF state is established for the LEDs 34, 134, a type of touch from a user, and associated response of the switch 356, may correspond to the OFF state. In this case, the LED-based lights 10, 110 can be responsive to associated different responses of the switch 356 to operate the LEDs 34, 134 to respective discrete ON states established for the LEDs 34, 134, and, if established, the OFF state for the LEDs 34, 134. Alternatively, the switch 356 could be singularly responsive to any touches from a user, in which case the LED-based lights 10, 110 could, for instance, be responsive to associated responses of the switch 356 to advance the operation of the LEDs 34, 134 in a looped manner through a limited number of discrete ON states established for the LEDs 34, 134, and, if established, the OFF state for the LEDs 34, 134.

Figure 9:
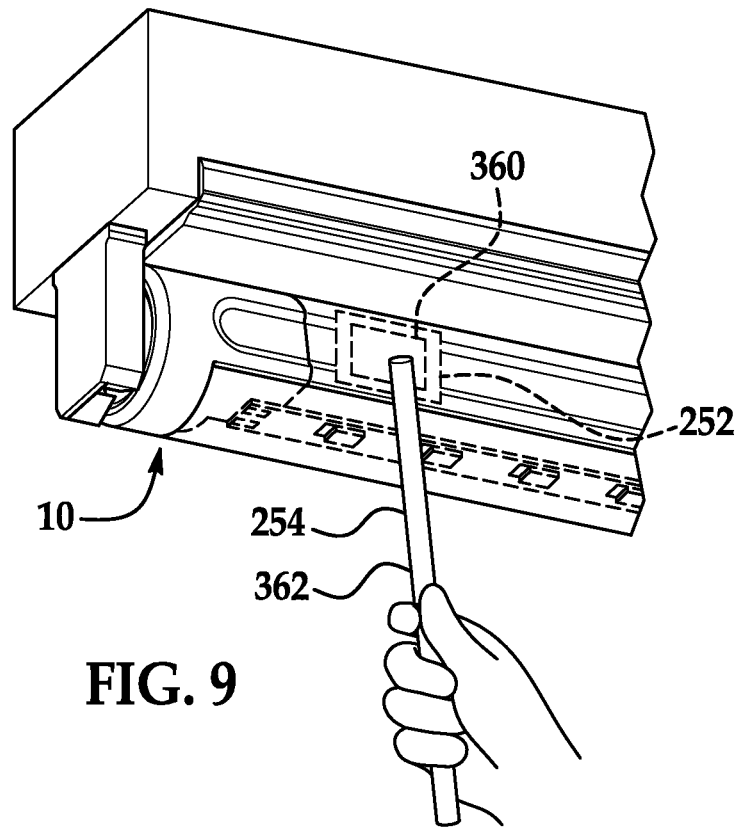
Figure 10:
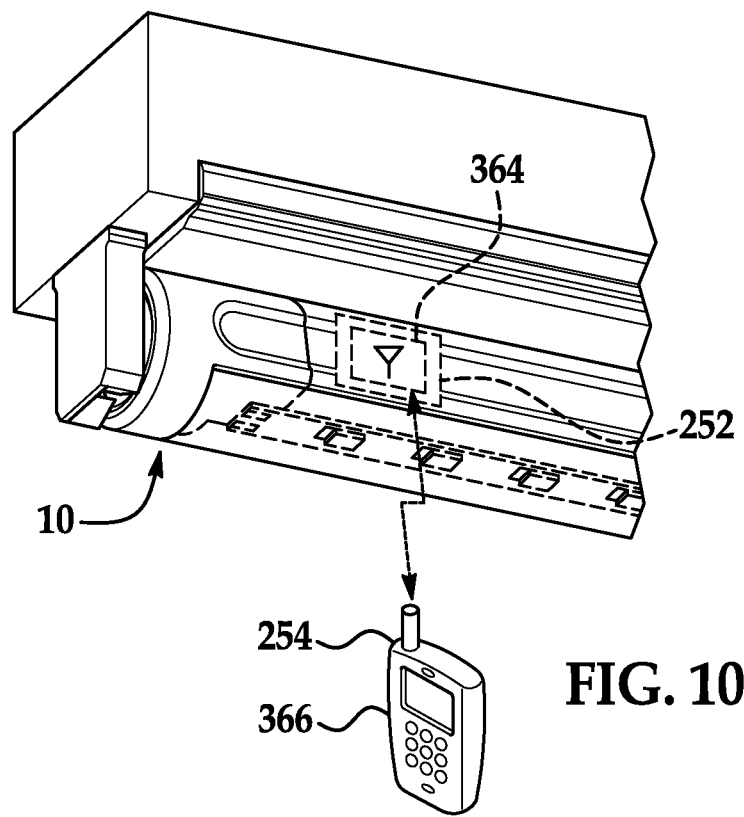
Figure 11:
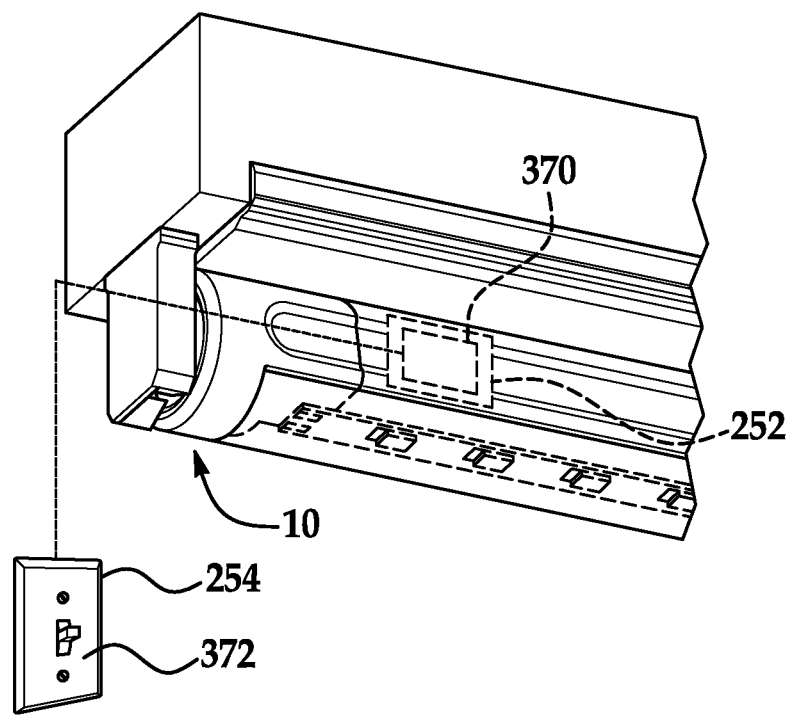

According to the examples of FIGS. 9-11, the user input interface 252 is included onboard the LED-based lights 10, 110 and configured to receive input from a user through a user input device 254 remote from the LED-based lights 10, 110.

In the example of FIG. 9, the user input interface 252 is implemented by a magnetic reed switch 360 internal to the LED-based light 10, 110, and the user input device 254 is implemented by a magnetized wand 362. In this example, the user can manipulate the wand 362 to communicate input indicating a desired operation for the LED-based lights 10, 110 by passing the wand 362 over the LED-based lights 10, 110 near the position of the magnetic reed switch 360 to actuate the magnetic reed switch 360. The user can pass the wand 362 to different positions over the LED-based lights 10, 110 near the position of the magnetic reed switch 360 to actuate the magnetic reed switch 360 to associated different positions corresponding, for instance, to a limited number of discrete ON states established for the LEDs 34, 134. Additionally, if the OFF state is established for the LEDs 34, 134, a user can pass the wand 362 to a position over the LED-based lights 10, 110 near the position of the magnetic reed switch 360 to actuate the magnetic reed switch 354 to an associated position corresponding to the OFF state. In this case, the LED-based lights 10, 110 can be responsive to passages of the wand 362 to different positions over the LED-based lights 10, 110 near the position of the magnetic reed switch 360 and associated actuations of the magnetic reed switch 360 to different positions to operate the LEDs 34, 134 to respective discrete ON states established for the LEDs 34, 134, and, if established, the OFF state for the LEDs 34, 134. Alternatively, the magnetic reed switch 360 could be a single position switch, in which case the LED-based lights 10, 110 could, for instance, be responsive to passages of the wand 362 over the LED-based lights 10, 110 near the position of the magnetic reed switch 360 and associated actuations of the magnetic reed switch 360 to advance the operation of the LEDs 34, 134 in a looped manner through a limited number of discrete ON states established for the LEDs 34, 134, and, if established, the OFF state for the LEDs 34, 134.

In the example of FIG. 10, the user input interface 252 is implemented by a receiver 364, and the user input device 254 is implemented a remote controller 366 configured for wireless communication with the receiver 364. The remote controller 366 can be a cell phone, as shown, or any other remote electronic device. The remote controller 366 and the receiver 364 can each include an antenna or other device enabling the transmission and receipt of radio signals, for instance. Alternatively, or additionally, the remote controller 366 and the receiver 364 can each include devices enabling the transmission and receipt of other types of signals, such as audio signals or infrared signals or other types of electromagnetic radiation.

The remote controller 366 can include one or more inputs that a user can manipulate to communicate input from the user indicating a desired operation for the LED-based lights 10, 110. The communication between the remote controller 366 and the receiver 364 could be carried by audible or inaudible audio signals, infrared signals, stroboscopic signals or radio signals, for example. In an example where the communication between the remote controller 366 and the receiver 364 is carried by radio signals, so-called near field communications could be used, for instance. In these and other examples, the input from the user can specify one of a limited number of discrete ON states established for the LEDs 34, 134, for instance. Additionally, if the OFF state is established for the LEDs 34, 134, the input from the user can specify the OFF state. In this case, the LED-based lights 10, 110 can be responsive to the communication of input from the remote controller 366 to operate the LEDs 34, 134 to a specified discrete ON state established for the LEDs 34, 134, and, if established, the OFF state for the LEDs 34, 134. Alternatively, the LED-based lights 10, 110 could, for instance, be responsive to the communication of input from the remote controller 366 to advance the operation of the LEDs 34, 134 in a looped manner through a limited number of discrete ON states established for the LEDs 34, 134, and, if established, the OFF state for the LEDs 34, 134.

In the example of FIG. 11, the user input interface 252 is implemented by a line monitor 370, and the user input device 254 is implemented by a wall mounted light switch 372 that a user can manipulate to communicate input indicating a desired operation for the LED-based lights 10, 110. In this example, the line monitor 370 can be responsive to actuations of the light switch 372, which can, for instance, be a two position switch as generally shown. Different types of manipulations of the light switch 372 (e.g., manipulations in different predetermined patterns or sequences) and associated different types of responses of the line monitor 370 can correspond, for instance, to a limited number of discrete ON states established for the LEDs 34, 134. Additionally, if the OFF state is established for the LEDs 34, 134, a type of manipulation of the light switch 372, and associated type of response of the line monitor 370, may correspond to the OFF state. In this case, the LED-based lights 10, 110 can be responsive to associated different types of responses of the line monitor 370 to operate the LEDs 34, 134 to respective discrete ON states established for the LEDs 34, 134, and, if established, the OFF state for the LEDs 34, 134. Alternatively, the LED-based lights 10, 110 could, for instance, be responsive to manipulations of the light switch 372 and associated responses of the line monitor 370 to advance the operation of the LEDs 34, 134 in a looped manner through a limited number of discrete ON states established for the LEDs 34, 134, and, if established, the OFF state for the LEDs 34, 134.

Figure 12:
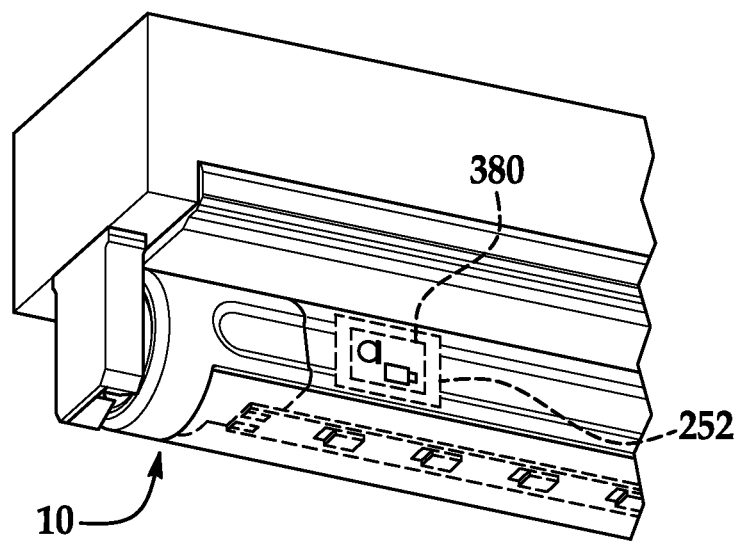

According to the example of FIG. 12, the user input interface 252 is implemented by an environmental sensor 380 configured to receive input from a user based on activity surrounding the LED-based lights 10, 110. The environmental sensor 380 may include one or more cameras or other proximity sensors for sensing objects in an area surrounding the LED-based lights 10, 110. The environmental sensor 380 may alternatively, or additionally, include one or more microphones or other sound sensors for sensing sound in an area surrounding the LED-based lights 10, 110. In this example, the input from the user can be recognized based on the identification of a predetermined gesture or a voice command from a user, for example. In these and other examples, the input from the user can specify one of a limited number of discrete ON states established for the LEDs 34, 134, for instance. Additionally, if the OFF state is established for the LEDs 34, 134, the input from the user can specify the OFF state. In this case, the LED-based lights 10, 110 can be responsive to the communication of input from the environmental sensor 380 to operate the LEDs 34, 134 to a specified discrete ON state established for the LEDs 34, 134, and, if established, the OFF state for the LEDs 34, 134. Alternatively, the LED-based lights 10, 110 could, for instance, be responsive to the communication of input from the environmental sensor 380 to advance the operation of the LEDs 34, 134 in a looped manner through a limited number of discrete ON states established for the LEDs 34, 134, and, if established, the OFF state for the LEDs 34, 134.

In the example implementations of the LED-based lights 10, 110 including the LED controller 200, the user input interface 252 (e.g., the external switch 350, the magnetic reed switch 354 actuated by the switch 352, the switch 356 responsive to the touch of a user, the magnetic reed switch 360 actuated by the wand 362, the receiver 364 communicating with the remote controller 366, the line monitor 370 responsive to the light switch 372 or the environmental sensor 380) is in communication with the LED controller 200 and is responsive to a user's input, whether received from a user directly or through an optional user input device 254, to activate the LED controller 200 to operate the LEDs 34, 134 according to the different operating states.

Where the LED controller 200 is implemented in whole or in part with a programmable controller, the LED controller 200 may be configured, based on input communicated from the user input interface 252, to identify an operating state for the LEDs 34, 134, and correspondingly for LED-based lights 10, 110, established in connection with the programming of the LED controller 200. According to the foregoing description, these operating states may include, for instance, a limited number of discrete ON states, either in total or for a given characteristic of the light emanating from the LED-based lights 10, 110 upon operation of the LEDs 34, 134, and optionally, the OFF state. In these implementations, the user input interface 252 may optionally be configured to generate and communicate digital signals to the LED controller 200.

The controller 200 may further be configured to operate the LEDs 34, 134 according to the identified operating state for the LEDs 34, 134. In some examples of the LED-based lights 10, 110, the power supply circuitry of the LED-based lights 10, 110 may be, include or otherwise be associated with the LED controller 200. In these examples, the LED controller 200 may be configured, for instance, to generate different PWM dimming signals that affect the supply of varying amounts of pulse-width modulated DC power to the LEDs 34, 134 according to respective different identified operating state for the LEDs 34, 134.

In examples of the LED-based lights 10, 110 where the LED controller 200 is implemented with an integrated circuit, the power supply circuitry of the LED-based lights 10, 110 may similarly be, include or otherwise be associated with the integrated circuit and connected componentry configured to generate different PWM dimming signals that affect the supply of varying amounts of pulse-width modulated DC power to the LEDs 34, 134 according to respective different operating state for the LEDs 34, 134.

In a non-limiting example, the power supply circuitry of the LED-based lights 10, 110 may be configured to generate a reference voltage at a reference voltage node, and to establish different resistances between the reference voltage node and the integrated circuit based on input communicated from the user input interface 252. The integrated circuit may, in turn, be configured to receive different analog dimming signals (e.g., different analog dimming voltage signals) generated at the integrated circuit as a result of the respective different resistances between the reference voltage node and the integrated circuit, and in response to the different analog dimming signals, generate different PWM dimming signals that affect the supply of varying amounts of pulse-width modulated DC power to the LEDs 34, 134 according to respective different identified operating state for the LEDs 34, 134.

The integrated circuit may generally be configured to receive large numbers, or a continuum, of different analog dimming signals, and to generate large numbers, or a continuum, of corresponding different PWM dimming signals. However, according to the foregoing description, the power supply circuitry of the LED-based lights 10, 110 may be configured to establish only a limited number of discrete resistances between the reference voltage node and the integrated circuit based on input communicated from the user input interface 252, corresponding to a limited number of discrete PWM dimming signals generated by the integrated controller to affect the supply of respective amounts of pulse-width modulated DC power to the LEDs 34, 134 according to a respective limited number of discrete ON states, either in total or for a given characteristic of the light emanating from the LED-based lights 10, 110 upon operation of the LEDs 34, 134, and optionally, the OFF state. Alternatively, the integrated circuit could be configured to only generate a limited number of discrete PWM dimming signals to affect the supply of respective amounts of pulse-width modulated DC power to the LEDs 34, 134 according to a respective limited number of discrete ON states, either in total or for a given characteristic of the light emanating from the LED-based lights 10, 110 upon operation of the LEDs 34, 134, and optionally, the OFF state, whether the power supply circuitry of the LED-based lights 10, 110 is configured to establish only a limited number of discrete resistances between the reference voltage node and the integrated circuit based on input communicated from the user input interface 252, as described above, or is configured to establish large numbers, or a continuum, of discrete resistances between the reference voltage node and the integrated circuit based on input communicated from the user input interface 252.

In one implementation, the power supply circuitry of the LED-based lights 10, 110 may include different paths having respective different resistances between the reference voltage node and the integrated circuit. Some paths may, for instance, be made between the reference voltage node and the integrated circuit based on input communicated from the user input interface 252. The same or other paths may, for instance, be unmade in favor of a different path between the reference voltage node and the integrated circuit based on input communicated from the user input interface 252.

It will be understood that the different paths having respective different resistances between the reference voltage node and the integrated circuit may be made and unmade, as the case may be, by switches. In one example, the power supply circuitry of the LED-based lights 10, 110 may include a voltage divider including a first branch defining a completed path between the reference voltage node and the integrated circuit with a given resistance, and one or more auxiliary branches defining respective partial paths between the reference voltage node and the integrated circuit with respective resistances that, when made, are parallel to first branch. In this example, one or more switches may be operably coupled between the first branch and the auxiliary branches to selectively make the partial paths of the auxiliary branches and bring them in parallel with the first branch in order to change the resistance of the path between the reference voltage node from that of the first branch to that of the first branch in parallel with the selectively made auxiliary branches, or, to selectively unmake the partial paths of the auxiliary branches to remove them from being in parallel with the first branch.

In some examples, the switches making and unmaking the different paths having respective different resistances between the reference voltage node and the integrated circuit can be, or include, components implementing the input interface 252, such as the external switch 350, the magnetic reed switch 354 actuated by the switch 352, the switch 356 responsive to the touch of a user or the magnetic reed switch 360 actuated by the wand 362, for example. In other examples, these switches may be responsive to these components implementing the input interface 252 or other components implementing the input interface 252 (e.g., the receiver 364 communicating with the remote controller 366, the line monitor 370 responsive to the light switch 372 or the environmental sensor 380).

In another implementation, the power supply circuitry of the LED-based lights 10, 110 may include a branch that defines a completed path between the reference voltage node and the integrated circuit, and that includes a variable resistor that changes its resistance based on input communicated from the user input interface 252. In some examples, the variable resistor of the branch defining a completed path between the reference voltage node and the integrated circuit can be, or include, components implementing the input interface 252, such as the external switch 350, the magnetic reed switch 354 actuated by the switch 352, the switch 356 responsive to the touch of a user or the magnetic reed switch 360 actuated by the wand 362, for example. In other examples, the variable resistor may be responsive to these components implementing the input interface 252 or other components implementing the input interface 252 (e.g., the receiver 364 communicating with the remote controller 366, the line monitor 370 responsive to the light switch 372 or the environmental sensor 380).

In another example of the LED-based lights 10, 110, the power supply circuitry of the LED-based lights 10, 110 may include an LED controller 200 implemented with other hardware components configured to generate different PWM dimming signals that affect the supply of varying amounts of pulse-width modulated DC power to the LEDs 34, 134 according to respective different operating state for the LEDs 34, 134. According to the foregoing description, these operating states may include, for instance, a limited number of discrete ON states, either in total or for a given characteristic of the light emanating from the LED-based lights 10, 110 upon operation of the LEDs 34, 134, and optionally, the OFF state. In this example, the hardware components configured to generate different PWM dimming signals can be, or include, components implementing the input interface 252, such as the external switch 350, the magnetic reed switch 354 actuated by the switch 352, the switch 356 responsive to the touch of a user, the magnetic reed switch 360 actuated by the wand 362, the receiver 364 communicating with the remote controller 366, the line monitor 370 responsive to the light switch 372 or the environmental sensor 380.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fluorescent tube replacement device for use in a conventional fluorescent tube fixture, comprising:
 a housing comprising:
  an opaque portion extending between opposing ends of the housing, and
  a transparent or translucent portion extending between the opposing ends of the housing;
 a first end cap and a second end cap disposed on respective ones of the opposing ends of the housing, wherein the first and second end caps are configured to physically engage the device with one or more sockets of the conventional fluorescent tube fixture;
 a plurality of LEDs disposed within the housing and oriented to emit light towards the transparent or translucent portion of the housing;
 an LED controller disposed within the housing and configured to operate the LEDs according to a plurality of different operating states, the different operating states including a plurality of discrete ON states; and
 a user input interface in communication with the LED controller, the user input interface configured to receive user input, and in response to the user input, activate the LED controller to operate the LEDs according to the different operating states, wherein the user input interface comprises a switch mounted to an exterior of the opaque portion and accessible to a user when the device is engaged with the one or more sockets of the conventional fluorescent tube fixture.

2. The fluorescent tube replacement device of claim 1, wherein the plurality of discrete ON states varies a given characteristic of light emanating from the fluorescent tube replacement device upon operation of the LEDs.

3. The fluorescent tube replacement device of claim 2, wherein the given characteristic is an intensity of the light emanating from the fluorescent tube replacement device upon operation of the LEDs.

4. The fluorescent tube replacement device of claim 3, wherein the plurality of discrete ON states includes a high intensity ON state and one or more intermediate intensity ON states.

5. The fluorescent tube replacement device of claim 1, wherein the plurality of discrete ON states is varies a power consumed by the fluorescent tube replacement device upon operation of the LEDs.

6. The fluorescent tube replacement device of claim 5, wherein the plurality of discrete ON states includes a high power ON state and one or more intermediate power ON states.

7. The fluorescent tube replacement device of claim 6, wherein the given characteristic is a spatial, spectral, color, color temperature or temporal aspect of light emanating from the fluorescent tube replacement device upon operation of the LEDs.

8. The fluorescent tube replacement device of claim 1, having two discrete ON states.

9. The fluorescent tube replacement device of claim 1, of having between two and ten discrete ON states.

10. The fluorescent tube replacement device of claim 1, wherein the different operating states further include an OFF state.

11. The fluorescent tube replacement device of claim 1, wherein the LED controller is implemented at least in part by a programmable controller, and the different operating states for the LEDs are established at least in part in connection with a programming of the programmable controller.

12. The fluorescent tube replacement device of claim 1, wherein the LED controller is implemented at least in part by an integrated circuit, and the different operating states for the LEDs are established at least in part in connection with circuitry of the integrated circuit.

13. A fluorescent tube replacement device, comprising:
a housing comprising:
  an opaque portion extending between opposing ends of the housing, and
  a transparent or translucent portion extending between the opposing ends of the housing;
a first end cap and a second end cap disposed on respective ones of the opposing ends of the housing, wherein the first and second end caps are configured to physically engage the device with one or more sockets of the conventional fluorescent tube fixture,
a plurality of LEDs disposed within the housing and oriented to emit light towards the transparent or translucent portion of the housing;
power supply circuitry for the LEDs disposed within the housing, the power supply circuitry:
  including an integrated circuit configured to receive analog dimming signals, and in response to the analog dimming signals, generate respective PWM dimming signals, and
  configured to operate the LEDs in response to the PWM dimming signals according to respective associated operating states for the LEDs, the operating states including a plurality of discrete ON states; and
a user input interface in communication with the power supply circuitry, the user input interface configured to receive user input, and in response to the user input, selectively activate the power supply circuitry to operate the LEDs according to the operating states, wherein the user input interface comprises a switch mounted to an exterior of the opaque portion and accessible to a user when the device is engaged with the one or more sockets of the conventional fluorescent tube fixture.

14. The fluorescent tube replacement device of claim 13, wherein the user input interface includes a user actuated switch for selectively activating the power supply circuitry to operate the LEDs according to the operating states.

* * * * *

UNITED STATES PATENT AND TRADEMARK OFFICE
CERTIFICATE OF CORRECTION

PATENT NO.        : 9,510,400 B2
APPLICATION NO.   : 14/709990
DATED             : November 29, 2016
INVENTOR(S)       : James R. Scapa et al.

Page 1 of 1

It is certified that error appears in the above-identified patent and that said Letters Patent is hereby corrected as shown below:

In the Claims

Column 19, Line 10, in Claim 5, after "states" delete "is".

Column 19, Line 24, in Claim 9, after "1," delete "of".

Column 20, Line 11, in Claim 13, after "sockets of" delete "the," and insert -- a --.

Column 20, Line 12, in Claim 13, delete "fixture," and insert -- fixture; --.

Signed and Sealed this
Twenty-eighth Day of February, 2017

Michelle K. Lee
*Director of the United States Patent and Trademark Office*